United States Patent
Xue et al.

(10) Patent No.: US 12,550,139 B2
(45) Date of Patent: Feb. 10, 2026

(54) UPLINK CONTROL INFORMATION TRANSMISSION METHOD AND APPARATUS

(71) Applicant: HUAWEI TECHNOLOGIES CO., LTD., Shenzhen (CN)

(72) Inventors: Yifan Xue, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 321 days.

(21) Appl. No.: 18/261,967

(22) PCT Filed: Dec. 15, 2021

(86) PCT No.: PCT/CN2021/138237
§ 371 (c)(1),
(2) Date: Jul. 18, 2023

(87) PCT Pub. No.: WO2022/156431
PCT Pub. Date: Jul. 28, 2022

(65) Prior Publication Data
US 2024/0080837 A1    Mar. 7, 2024

(30) Foreign Application Priority Data

Jan. 19, 2021 (CN) .................. 202110069446.X
Mar. 16, 2021 (CN) .................... 202110281553.9

(51) Int. Cl.
*H04W 72/1268* (2023.01)
*H04B 7/06* (2006.01)
(Continued)

(52) U.S. Cl.
CPC ...... *H04W 72/1268* (2013.01); *H04B 7/0626* (2013.01); *H04L 1/1812* (2013.01); *H04W 72/21* (2023.01); *H04W 72/232* (2023.01)

(58) Field of Classification Search
None
See application file for complete search history.

(56) References Cited

U.S. PATENT DOCUMENTS

| 11,539,493 | B2 * | 12/2022 | Gao ...................... H04L 1/1812 |
| 2019/0349964 | A1 * | 11/2019 | Liou .................. H04W 72/046 |

(Continued)

FOREIGN PATENT DOCUMENTS

| EP | 3723317 A2 | 10/2020 |
| WO | 2020024754 A1 | 2/2020 |
| WO | 2020197338 A1 | 10/2020 |

OTHER PUBLICATIONS

Moderator (Apple), "Summary for [107-e-NR-7.1CRs-6] Issue #10: Discussion on HARQ-ACK multiplexing on PUSCH," 3GPP TSG RAN WG1 Meeting #107-e, e-Meeting, R1-2112859, Mobile Competence Centre 650, Route Deslucioles, F-06921 Sophia Antipolis Cedex, France, XP052098053, Total 46 pages, 3rd Generation Partnership Project, Valbonne, France (Aug. 16-27, 2021).

(Continued)

*Primary Examiner* — Xavier S Wong
(74) *Attorney, Agent, or Firm* — Leydig, Voit & Mayer, Ltd.

(57) ABSTRACT

A transmission method is disclosed. A terminal device transmits uplink control information to a network device through a PUSCH when a time domain location of a PUCCH including the uplink control information is between that of DCI and that of a PUSCH; or a time domain location of a PUSCH is before that of a PUCCH, and a time domain length between a time domain location of a PDSCH corresponding to the uplink control information and the time domain location of the PUSCH is greater than or equal to a first time domain length; or a time domain location of a PUSCH is before that of a PUCCH, and a time domain length between a time domain location of a CSI-RS corre- (Continued)

sponding to the uplink control information and the time domain location of the PUSCH is greater than or equal to a second time domain length.

20 Claims, 33 Drawing Sheets

(51) Int. Cl.
    *H04L 1/1812* (2023.01)
    *H04W 72/21* (2023.01)
    *H04W 72/232* (2023.01)

(56) References Cited

U.S. PATENT DOCUMENTS

| | | | |
|---|---|---|---|
| 2020/0404658 A1 | 12/2020 | Lin et al. | |
| 2022/0182160 A1* | 6/2022 | Su | H04B 17/309 |
| 2022/0264615 A1* | 8/2022 | Kang | H04W 72/23 |
| 2022/0271812 A1* | 8/2022 | Matsumura | H04B 7/0478 |
| 2022/0295297 A1* | 9/2022 | Li | H04W 16/28 |

OTHER PUBLICATIONS

"3rd Generation Partnership Project: Technical Specification Group Radio Access Network, NR; Physical layer procedures for control (Release 16)," 3GPP TS 38.213 V16,4.0, Total 181 pages (Dec. 2020).

CATT, "Correction on timeline definition for uplink physical channel overlapping," 3GPP TSG-RAN WG1 Meeting #97, R1-1906298, Reno, USA, total 7 pages (May 13-17, 2019).

"3rd Generation Partnership Project, Technical Specification Group Radio Access Network; NR; Physical layer procedures for data (Release 18)," 3GPP TS 38.214 V16.4.0, total 169 pages (Dec. 2020).

* cited by examiner

UPLINK CONTROL INFORMATION TRANSMISSION METHOD AND APPARATUS

CROSS-REFERENCE TO RELATED APPLICATIONS

This application is a National Stage of International Application No. PCT/CN2021/138237, filed on Dec. 15, 2021, which claims priority to Chinese Patent Application No. 202110069446.X, filed on Jan. 19, 2021, and Chinese Patent Application No. 202110281553.9, filed on Mar. 16, 2021. All of the aforementioned applications are hereby incorporated herein by reference in their entireties.

TECHNICAL FIELD

This application relates to the field of communication technologies, and in particular, to an uplink control information transmission method and an apparatus.

BACKGROUND

A terminal device that supports a 5th generation new radio access technology (5G NR) generally needs to support a relatively large bandwidth (for example, 100 megahertz (MHz)), a relatively large quantity of antennas (for example, four receive (RX) antennas and two transmit (TX) antennas), and a relatively complex baseband processing procedure (for example, a polar code). Consequently, power consumption of the terminal device is relatively high. Currently, to reduce the power consumption of the terminal device, research on reduction of the power consumption of the terminal device is increasingly popular. However, in current research, optimization is mainly implemented for downlink transmission of the terminal device, but not for uplink transmission.

SUMMARY

This application provides an uplink control information transmission method and an apparatus, to optimize transmission of uplink control information, thereby reducing power consumption of a terminal device.

According to a first aspect, this application provides an uplink control information transmission method. The method may include: When a relationship between a time domain location of a physical uplink control channel (PUCCH) including uplink control information and a time domain location of a physical uplink shared channel (PUSCH) can meet:
  a first condition, where the first condition may include: the time domain location of the PUCCH is between a time domain location of downlink control information DCI and the time domain location of the PUSCH, where the DCI is used to schedule transmission of the PUSCH, and the uplink control information includes one or more of hybrid automatic repeat request (HARQ) feedback, a periodic channel state information (P-CSI) report, or a semi-persistent channel state information (semi-persistent CSI, SP-CSI) report; or
  the time domain location of the PUSCH is before the time domain location of the PUCCH, and a time domain length between a time domain location of a physical downlink shared channel PDSCH corresponding to the uplink control information and the time domain location of the PUSCH is greater than or equal to a first time domain length, where the uplink control information includes HARQ feedback; or
  the time domain location of the PUSCH is before the time domain location of the PUCCH, and a time domain length between a time domain location of a CSI reference signal (RS) (CSI-RS) corresponding to the uplink control information and the time domain location of the PUSCH is greater than or equal to a second time domain length, where the uplink control information includes a P-CSI report or an SP-CSI report; or
  the time domain location of the PUCCH is before the time domain location of the PUSCH, and a time domain length between the time domain location of the PUCCH and the time domain location of the PUSCH is less than or equal to a third time domain length, where the uplink control information includes one or more of HARQ feedback, a P-CSI report, or an SP-CSI report,
a terminal device may transmit the uplink control information to a network device through the PUSCH.

According to the foregoing method, the uplink control information is transmitted through the PUSCH, so that a quantity of uplink transmission times can be reduced, thereby reducing power consumption of the terminal device.

In a possible design, the first condition may further include that a time domain length between the time domain location of the DCI and the time domain location of the PUCCH may be greater than or equal to a fourth time domain length. In this way, it can be ensured that the terminal device can have enough time to complete DCI decoding, so that the terminal device learns whether PUSCH scheduling is performed subsequently.

In a possible design, the fourth time domain length may be a current minimum scheduling offset.

In a possible design, the first condition may further include that the time domain length between the time domain location of the PUCCH and the time domain location of the PUSCH may be less than or equal to a fifth time domain length. In this way, a transmission latency of the uplink control information can be reduced.

In a possible design, the first condition may further include that when the uplink control information includes the P-CSI report or the SP-CSI report, and the DCI triggers an aperiodic channel state information AP-CSI report, report content of the P-CSI report or the SP-CSI report included in the uplink control information may be different from report content of an AP-CSI report included on the PUSCH. In this way, repeated transmission of CSI reports having a same function can be avoided.

In a possible design, when the uplink control information includes the P-CSI report or the SP-CSI report, the DCI triggers the aperiodic channel state information AP-CSI report, and the report content of the P-CSI report or the SP-CSI report included in the uplink control information is fully or partially the same as the report content of the AP-CSI report included on the PUSCH, the terminal device drops the uplink control information, namely, does not send the uplink control information. In this way, repeated transmission of CSI reports having a same function can be avoided.

In a possible design, the report content (reportQuantity) is configured by the network device for the terminal device. The report content is used to identify a type of channel state information included in a current CSI report.

In a possible design, that the terminal device transmits the uplink control information to the network device through the PUSCH may be specifically that the terminal device performs bit concatenation on the uplink control information and information included on the PUSCH to obtain first information, and then the terminal device transmits the first information to the network device through the PUSCH. In this way, the terminal device can successfully transmit the uplink control information to the network device through the PUSCH. In addition, the quantity of uplink transmission times can be reduced, thereby reducing power consumption of the terminal device.

In a possible design, that the terminal device transmits the uplink control information to the network device through the PUSCH may be specifically that the terminal device punctures the PUSCH, and maps the uplink control information to a punctured location of the PUSCH to obtain second information, and then the terminal device transmits the second information to the network device through the PUSCH. In this way, the terminal device can successfully transmit the uplink control information to the network device through the PUSCH. In addition, the quantity of uplink transmission times can be reduced, thereby reducing power consumption of the terminal device.

In a possible design, when the time domain length between the time domain location of the PUCCH and the time domain location of the PUSCH is greater than or equal to a sixth time domain length, or a quantity of information bits of the uplink control information is greater than or equal to a first value, the terminal device transmits the uplink control information by using an information bit concatenation method. In this way, the terminal device can successfully transmit the uplink control information to the network device through the PUSCH.

In a possible design, when the time domain length between the time domain location of the PUCCH and the time domain location of the PUSCH is less than a sixth time domain length, or a quantity of information bits of the uplink control information is less than a first value, the terminal device transmits the uplink control information by using a puncturing method. In this way, the terminal device can successfully transmit the uplink control information to the network device through the PUSCH.

In a possible design, when the relationship between the time domain location of the PUCCH including the uplink control information and the time domain location of the PUSCH meets the first condition, or when the time domain location of the PUCCH is before the time domain location of the PUSCH, and the time domain length between the time domain location of the PUCCH and the time domain location of the PUSCH is less than or equal to the third time domain length, the terminal device may determine, based on a value relationship between the sixth time domain length and the time domain length between the time domain location of the PUCCH and the time domain location of the PUSCH, whether to transmit the uplink control information by using the information bit concatenation method or the puncturing method.

In a possible design, the terminal device receives a first message from the network device. The first message is used to configure or enable a function of transmitting the uplink control information through the PUSCH by the terminal device. In this way, the terminal device can transmit the uplink control information to the network device through the PUSCH.

In a possible design, the terminal device sends a second message to the network device. The second message is used to request to enable the function of transmitting the uplink control information through the PUSCH. In this way, the terminal device can transmit the uplink control information to the network device through the PUSCH.

In a possible design, the terminal device receives a third message from the network device. The third message is used to indicate the terminal device to transmit the uplink control information through the PUSCH. In this way, the terminal device can transmit the uplink control information to the network device through the PUSCH.

In a possible design, before the terminal device transmits the uplink control information to the network device through the PUSCH, the terminal device determines that a reference signal received power (RSRP) sent to the network device after the terminal device receives a reference signal from the network device may be greater than an RSRP threshold. The RSRP is determined by the terminal device based on the reference signal. In this way, transmission performance of the terminal device can be ensured.

In a possible design, that the terminal device transmits the uplink control information to the network device through the PUSCH may be specifically that the terminal device may transmit the uplink control information to the network device through the PUSCH by using a first transmit power. The first transmit power is greater than an original transmit power of the PUSCH. Alternatively, the first transmit power is determined based on an original transmit power of the PUSCH and an original transmit power of the PUCCH. In this way, average allocated energy per bit can be improved, thereby ensuring transmission performance of the terminal device.

In a possible design, the quantity of information bits of the uplink control information may be less than or equal to a second value. The second value may be predefined, or may be configured by the network device. In this way, it can be ensured that the terminal device successfully transmits the uplink control information to the network device through the PUSCH.

In a possible design, that the terminal device transmits the uplink control information to the network device through the PUSCH may be specifically that the terminal device determines first K bits in descending order of priorities of bits in the uplink control information, where a quantity of information bits of the uplink control information is greater than M, and K is less than or equal to M; and then, the terminal device transmits the K bits to the network device through the PUSCH. In this way, it can be ensured that the terminal device successfully transmits the uplink control information to the network device through the PUSCH.

In a possible design, the first time domain length may satisfy the following formula:

$$\text{first time domain length} = (N_1 + d_{1,1} + d_2)(2048 + 144) \cdot \kappa 2^{-\mu} \cdot T_C$$

Herein, $N_1$ is a processing capability reported by the terminal device, and a value of $N_1$ is related to subcarrier spacing (SCS) or a system parameter; $d_{1,1}$ and $d_2$ are related to a PDSCH mapping type, a symbol length occupied by the PDSCH, and the like; $\mu$ is a system parameter; $T_c=1/(\Delta f_{max} \cdot N_f)$, $\Delta f_{max}=480 \cdot 10^3$ Hz, and $N_f=4096$; and $\kappa=T_s/T_c=64$, $T_s=1/(\Delta f_{ref} \cdot N_{f,ref})$, and $\Delta f_{ref}=15 \cdot 10^3$ Hz.

In a possible design, the second time domain length may satisfy the following formula:

$$\text{second time domain length} = (Z)(2048+144) \cdot \kappa 2^{-\mu} \cdot T_C$$

Herein, Z is a predefined value; $T_c=1/(\Delta f_{max} \cdot N_f)$, $\Delta f_{max}=480 \cdot 10^3$ Hz, and $N_f=4096$; and $\kappa=T_s/T_c=64$, $T_s=1/(\Delta f_{ref} \cdot N_{f,ref})$, and $\Delta f_{ref}=15 \cdot 10^3$ Hz.

According to a second aspect, this application provides an uplink control information transmission method. The method may include: When a relationship between a time domain location of a PUCCH including uplink control information and a time domain location of a PUSCH can meet:

a first condition, where the first condition may include: the time domain location of the PUCCH is between a time domain location of downlink control information DCI and the time domain location of the PUSCH, and the DCI is used to schedule transmission of the PUSCH, where the uplink control information includes one or more of HARQ feedback, a P-CSI report, or an SP-CSI report; or the time domain location of the PUSCH is before the time domain location of the PUCCH, and a time domain length between a time domain location of a PDSCH corresponding to the uplink control information and the time domain location of the PUSCH is greater than or equal to a first time domain length, where the uplink control information includes HARQ feedback; or the time domain location of the PUSCH is before the time domain location of the PUCCH, and a time domain length between a time domain location of a CSI-RS corresponding to the uplink control information and the time domain location of the PUSCH is greater than or equal to a second time domain length, where the uplink control information includes a P-CSI report and/or an SP-CSI report; or the time domain location of the PUCCH is before the time domain location of the PUSCH, and a time domain length between the time domain location of the PUCCH and the time domain location of the PUSCH is less than or equal to a third time domain length, where the uplink control information includes one or more of HARQ feedback, a P-CSI report, or an SP-CSI report, a network device may receive the uplink control information transmitted by a terminal device through the PUSCH.

According to the foregoing method, the uplink control information is transmitted through the PUSCH, so that a quantity of uplink transmission times can be reduced, thereby reducing power consumption of the terminal device.

In a possible design, the first condition may further include that a time domain length between the time domain location of the DCI and the time domain location of the PUCCH may be greater than or equal to a fourth time domain length. In this way, it can be ensured that the terminal device can have enough time to complete DCI decoding, so that the terminal device learns whether PUSCH scheduling is performed subsequently.

In a possible design, the fourth time domain length is a current minimum scheduling offset.

In a possible design, the first condition may further include that the time domain length between the time domain location of the PUCCH and the time domain location of the PUSCH may be less than or equal to a fifth time domain length. In this way, a transmission latency of the uplink control information can be reduced.

In a possible design, the first condition may further include that when the UCI includes the P-CSI report or the SP-CSI report, and the DCI triggers an AP-CSI report, report content of the P-CSI report or the SP-CSI report included in the UCI may be different from report content of the AP-CSI report included on the PUSCH. In this way, repeated transmission of CSI reports having a same function can be avoided.

In a possible design, when the uplink control information includes the P-CSI report or the SP-CSI report, the DCI triggers the aperiodic channel state information AP-CSI report, and the report content of the P-CSI report or the SP-CSI report included in the uplink control information is fully or partially the same as the report content of the AP-CSI report included on the PUSCH, the network device does not receive the uplink control information. In this way, repeated transmission of CSI reports having a same function can be avoided.

In a possible design, the report content (reportQuantity) is configured by the network device for the terminal device. The report content is used to identify a type of channel state information included in a current CSI report.

In a possible design, that the network device receives the uplink control information transmitted by the terminal device through the PUSCH may be specifically that the network device receives first information transmitted by the terminal device through the PUSCH. The first information is obtained by performing bit concatenation on the uplink control information and information included on the PUSCH by the terminal device. In this way, the network device can successfully receive the uplink control information transmitted by the terminal device through the PUSCH. In addition, the quantity of uplink transmission times can be reduced, thereby reducing power consumption of the terminal device.

In a possible design, that the network device receives the uplink control information transmitted by the terminal device through the PUSCH may be specifically that the network device receives second information transmitted by the terminal device through the PUSCH. The second information is obtained by puncturing the PUSCH and mapping the uplink control information to a punctured location of the PUSCH by the terminal device. In this way, the network device can successfully receive the uplink control information transmitted by the terminal device through the PUSCH. In addition, the quantity of uplink transmission times can be reduced, thereby reducing power consumption of the terminal device.

In a possible design, when the time domain length between the time domain location of the PUCCH and the time domain location of the PUSCH is greater than or equal to a sixth time domain length, or a quantity of information bits of the uplink control information is greater than or equal to a first value, the uplink control information is transmitted by using an information bit concatenation method. In this way, the network device can successfully receive the uplink control information transmitted through the PUSCH.

In a possible design, when the time domain length between the time domain location of the PUCCH and the time domain location of the PUSCH is less than a sixth time domain length, or a quantity of information bits of the uplink control information is less than a first value, the uplink control information is transmitted by using a puncturing method. In this way, the network device can successfully receive the uplink control information transmitted through the PUSCH.

In a possible design, when the relationship between the time domain location of the PUCCH including the uplink control information and the time domain location of the PUSCH meets the first condition, or when the time domain location of the PUCCH is before the time domain location of the PUSCH, and the time domain length between the time domain location of the PUCCH and the time domain location of the PUSCH is less than or equal to the third time domain length, the network device may determine, based on a value relationship between the sixth time domain length and the time domain length between the time domain location of the PUCCH and the time domain location of the PUSCH, whether the terminal device transmits the uplink control information by using the information bit concatenation method or the puncturing method.

In a possible design, the network device sends a first message to the terminal device. The first message is used to configure or enable a function of transmitting the uplink control information through the PUSCH by the terminal device. In this way, the network device can receive the uplink control information transmitted through the PUSCH.

In a possible design, the network device receives a second message from the terminal device. The second message is used to request to enable the function of transmitting the uplink control information through the PUSCH. In this way, the network device can receive the uplink control information transmitted through the PUSCH.

In a possible design, the network device sends a third message to the terminal device. The third message is used to indicate the terminal device to transmit the uplink control information through the PUSCH. In this way, the network device can receive the uplink control information transmitted through the PUSCH.

In a possible design, before the network device receives the uplink control information transmitted by the terminal device through the PUSCH, the network device determines that an RSRP from the terminal device is greater than an RSRP threshold. The RSRP is sent after the terminal device receives a reference signal from the network device. The RSRP is determined by the terminal device based on the reference signal. In this way, transmission performance can be ensured.

In a possible design, the quantity of information bits of the uplink control information is less than or equal to a second value. The second value may be predefined, or may be configured by the network device. In this way, it can be ensured that the network device can receive the uplink control information transmitted through the PUSCH.

In a possible design, that the network device receives the uplink control information transmitted by the terminal device through the PUSCH may be specifically that the network device receives K bits in the uplink control information transmitted by the terminal device through the PUSCH. The K bits are first K bits determined by the terminal device in descending order of priorities of bits in the uplink control information. A quantity of information bits of the uplink control information is greater than M, and K is less than or equal to M. In this way, it can be ensured that the network device successfully receives the uplink control information transmitted through the PUSCH.

In a possible design, the first time domain length may satisfy the following formula:

$$\text{first time domain length} = (N_1 + d_{1,1} + d_2)(2048 + 144) \cdot \kappa 2^{-\mu} \cdot T_C$$

Herein, $N_1$ is a processing capability reported by the terminal device, and a value of $N_1$ is related to subcarrier spacing (SCS) or a system parameter; $d_{1,1}$ and $d_2$ are related to a PDSCH mapping type, a symbol length occupied by the PDSCH, and the like; $\mu$ is a system parameter; $T_c = 1/(\Delta f_{max} \cdot N_f)$, $\Delta f_{max} = 480 \cdot 10^3$ Hz, and $N_f = 4096$; and $\kappa = T_s/T_c = 64$, $T_s = 1/(\Delta f_{ref} \cdot N_{f,ref})$, and $\Delta f_{ref} = 15 \cdot 10^3$ Hz.

In a possible design, the second time domain length may satisfy the following formula:

$$\text{second time domain length} = (Z)(2048 + 144) \cdot \kappa 2^{-\mu} \cdot T_C$$

Herein, Z is a predefined value; $T_c = 1/(\Delta f_{max} \cdot N_f)$, $\Delta f_{max} = 480 \cdot 10^3$ Hz, and $N_f = 4096$; and $\kappa = T_s/T_c = 64$, $T_s = 1/(\Delta f_{ref} \cdot N_{f,ref})$, and $\Delta f_{ref} = 15 \cdot 10^3$ Hz.

According to a third aspect, this application further provides a communication apparatus. The communication apparatus may be a terminal device. The communication apparatus has a function of implementing the terminal device in the first aspect or the possible design examples of the first aspect. The function may be implemented by hardware, or may be implemented by hardware by executing corresponding software. The hardware or the software includes one or more modules corresponding to the function.

In a possible design, a structure of the communication apparatus may include a transceiver unit and a processing unit. These units may implement corresponding functions of the terminal device in the first aspect or the possible design examples of the first aspect. For details, refer to the detailed description in the method examples. Details are not described herein again.

In a possible design, a structure of the communication apparatus includes a transceiver and a processor, and optionally further includes a memory. The transceiver is configured to send and receive data or information, and is configured to communicate and interact with another device in a communication system. The processor is configured to support the communication apparatus in implementing the corresponding functions of the terminal device in the first aspect or the possible design examples of the first aspect. The memory is coupled to the processor, and stores program instructions and data that are necessary for the communication apparatus.

According to a fourth aspect, this application further provides a communication apparatus. The communication apparatus may be a network device. The communication apparatus has a function of implementing the network device in the second aspect or the possible design examples of the second aspect. The function may be implemented by hardware, or may be implemented by hardware by executing corresponding software. The hardware or the software includes one or more modules corresponding to the function.

In a possible design, a structure of the communication apparatus may include a transceiver unit and a processing unit. These units may implement corresponding functions of the network device in the second aspect or the possible design examples of the second aspect. For details, refer to the detailed description in the method examples. Details are not described herein again.

In a possible design, a structure of the communication apparatus includes a transceiver and a processor, and optionally further includes a memory. The transceiver is configured to send and receive data or information, and is configured to communicate and interact with another device in a communication system. The processor is configured to support the communication apparatus in implementing the corresponding functions of the network device in the second aspect or the possible design examples of the second aspect. The memory is coupled to the processor, and stores program instructions and data that are necessary for the communication apparatus.

According to a fifth aspect, an embodiment of this application provides a communication system. The communication system may include the terminal device and the network device mentioned above.

According to a sixth aspect, an embodiment of this application provides a computer-readable storage medium. The computer-readable storage medium stores program instructions. When the program instructions are executed on a computer, the computer is enabled to implement the method in the first aspect or the possible design examples of the first aspect or the method in the second aspect or the possible design examples of the second aspect in embodiments of this application. For example, the computer-readable storage medium may be any available medium accessible to a computer. The following provides an example but does not impose a limitation: The computer-readable medium may include a non-transient computer-readable medium, a random-access memory (RAM), a read-only memory (ROM), an electrically erasable programmable read-only memory (electrically EPROM, EEPROM), a CD-ROM or another optical disc storage, a magnetic disk storage medium or another magnetic storage device, or any other medium that can be used to carry or store expected program code in a form of an instruction or a data structure and that can be accessed by a computer.

According to a seventh aspect, an embodiment of this application provides a computer program product including computer program code or instructions. When the computer program product is run on a computer, the computer is enabled to implement the method in the first aspect or the possible design examples of the first aspect or the method in the second aspect or the possible design examples of the second aspect.

According to an eighth aspect, this application further provides a chip. The chip is coupled to a memory, and is configured to read and execute program instructions stored in the memory, to implement the method in the first aspect or each possible design example in the first aspect or the method in the second aspect or each possible design example in the second aspect.

For the foregoing aspects from the third aspect to the eighth aspect and technical effect that can be achieved in the foregoing aspects, refer to the description of the technical effect that can be achieved through the possible solutions in the first aspect or the second aspect. Details are not described herein again.

DESCRIPTION OF EMBODIMENTS

This application is further described below in detail with reference to the accompanying drawings.

Embodiments of this application provide an uplink control information transmission method and an apparatus, to optimize transmission of uplink control information, thereby reducing power consumption of a terminal device. The method and the apparatus in this application are based on a same technical concept. Because a problem-resolving principle of the method is similar to that of the apparatus, mutual reference may be made among implementations of the apparatus and the method. Repeated description is not provided.

In addition, in description of this application, terms such as "first", "second", and "third" are merely used for differentiated description, and shall not be understood as an indication or implication of relative importance or an indication or implication of an order. In other words, in this application, first, second, third, . . . , and $N^{th}$ (N is one, two, three, four, . . . , or the like) are merely used for differentiated description, and do not constitute a limitation on an order. They may not appear in order. In other words, "fourth", "fifth", and the like may appear before "first" and the like. This is not limited in this application.

In the description of this application, "at least one item (piece, or type)" means one item (piece, or type) or a plurality of items (pieces, or types), and a plurality of items (pieces, or types) mean two or more items (pieces, or types).

To describe the technical solutions in embodiments of this application more clearly, the following describes in detail an uplink control information transmission method and an apparatus provided in embodiments of this application with reference to the accompanying drawings.

Figure 1:
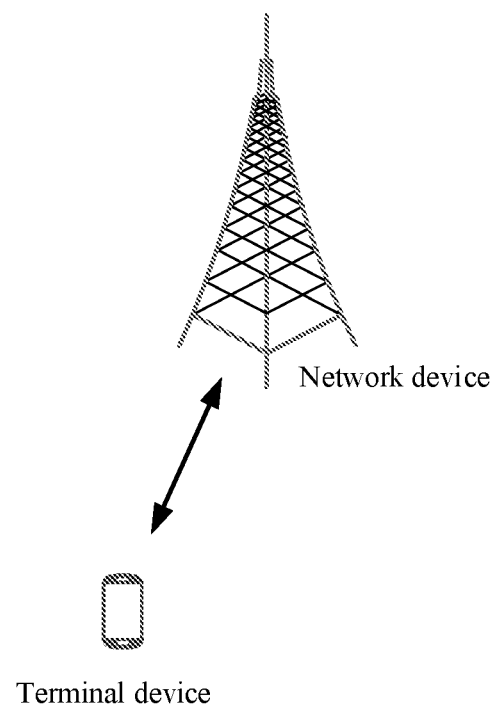
FIG. 1 is a schematic diagram of an architecture of a communication system according to this application.

FIG. 1 shows an architecture of a communication system according to an embodiment of this application. The architecture of the communication system includes a network device and a terminal device.

The network device is a device that has wireless receiving and sending functions or a chip that can be disposed in the network device. The network device includes but is not limited to a base station (generation NodeB, gNB), a radio network controller (RNC), a NodeB (NB), a base station controller (BSC), a base transceiver station (BTS), a home base station (for example, a home evolved NodeB, or a home NodeB (HNB)), a baseband unit (BBU), an access point (AP) in a wireless fidelity (Wi-Fi) system, a wireless relay node, a wireless backhaul node, a transmission point (transmission and reception point (TRP), or transmission point (TP)), and the like. The network device may be alternatively a network node that constitutes a gNB or a transmission point, for example, a baseband unit (BBU), or a distributed unit (DU).

In some deployments, the gNB may include a central unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer; and the DU implements functions of a radio link control (RLC) layer, a media access control (MAC) layer, and a physical (PHY) layer. Information of the RRC layer eventually becomes information of the PHY layer, or is converted from information of the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in a radio access network RAN, or the CU may be classified as a network device in a core network CN. This is not limited herein.

The terminal device may also be referred to as a user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone, a tablet computer (tablet), a computer having wireless receiving and sending functions, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a smart wearable device (such as smart glasses, a smartwatch, or a smart headset), a wireless terminal in a smart home, or the like. The terminal device may be alternatively a chip or a chip module (or a chip system), or the like that can be disposed in the foregoing device. An application scenario is not limited in embodiments of this application. In this application, a terminal device having wireless receiving and sending functions and a chip that can be disposed in the terminal device are collectively referred to as a terminal device.

It should be noted that the communication system shown in FIG. 1 may be but is not limited to a 4th generation (4G) system, a 5th generation (5G) system, such as a new radio access technology (NR). Optionally, the method in embodiments of this application is further applicable to various future communication systems, such as a 6th generation (6G) system or another communication network.

Uplink transmission of NR and a related procedure may be described as follows:

1. Uplink data: The uplink data is carried on a physical uplink shared channel (PUSCH) for transmission.

(1) A time domain location of transmission of the PUSCH is usually indicated by downlink control information (DCI) sent by the network device to the terminal device. Specifically, if the network device sends one piece of DCI in a slot n, and the DCI indicates a value of K2, the terminal device sends a PUSCH in a slot (n+K2). Scheduling the PUSCH by using DCI is generally referred to as dynamic data scheduling.

(2) There is another transmission manner of the PUSCH in a standard, namely, a transmission manner of a configured grant (CG). The CG may be classified into two cases: In one case, a transmission parameter of the PUSCH is configured for the terminal device by using radio resource control (RRC) signaling of the network device. When the terminal device needs to send uplink data, the terminal device sends the uplink data through the preconfigured PUSCH. In the other case, some transmission parameters of the PUSCH are configured by using RRC signaling of the network device, and remaining transmission parameters are indicated by the DCI. When the network device sends the DCI to activate sending of the PUSCH, the terminal device periodically sends the PUSCH based on a configured period value until the network device sends another piece of DCI to stop the sending of the PUSCH of the terminal device. Therefore, in the transmission manner of the CG, there may be a case in which "there is only a PUSCH but no DCI".

2. Hybrid automatic repeat request (HARQ) feedback: The HARQ feedback is usually carried in a PUCCH for transmission. A time domain location of the PUCCH carrying the HARQ feedback may be indicated by DCI. The DCI is sent by the network device to the terminal device. Specifically, if the network device sends one piece of DCI in a slot n to schedule transmission of downlink data, the DCI indicates a value of K0 and a value of K1. The terminal device receives a physical downlink shared channel (PDSCH) in a slot (n+K0). The PDSCH includes the downlink data. In addition, the terminal device sends, in a slot (n+K0+K1), HARQ feedback corresponding to the PDSCH.

3. Channel state information (CSI) report (CSI report): After receiving a CSI reference signal (RS) (CSI-RS) sent by the network device, the terminal device sends a CSI report to the network device. The CSI report may be classified into the following three types:

(1) Aperiodic CSI report (P-CSI report) is usually transmitted on the PUCCH. Once the network device configures the periodic CSI report for the terminal device, the terminal device sends the CSI report based on a configured period. In other words, a time domain location of the periodic CSI report is semi-statically configured by using RRC signaling.

(2) A semi-persistent CSI report (SP-CSI report) is usually transmitted on the PUCCH, like the periodic CSI report. However, a difference between the semi-persistent CSI report and the periodic CSI report lies in that after the network device configures the semi-persistent CSI report for the terminal device, the semi-persistent CSI report further needs to be activated. After the activation, a time domain location of the semi-persistent CSI report may be considered to be semi-statically configured by using RRC signaling.

(3) An aperiodic CSI report (AP-CSI report) is transmitted on the PUSCH and triggered by DCI. Specifically, if the network device sends one piece of DCI in a slot n, the DCI indicates a value of K2, and may further include aperiodic CSI trigger information. If the DCI includes the aperiodic CSI trigger information, the terminal device adds the aperiodic CSI report to the scheduled PUSCH.

In this application, to reduce power consumption of the terminal device, it is proposed that optimized transmission may be implemented for the uplink transmission. Specifically, an uplink control information transmission method is mainly described in detail in this application. It should be noted that the uplink control information may be uplink control information (UCI) in 5G. In a subsequent communication system or network, for example, 6G, the uplink control information may still be UCI, or may have another name. This is not limited in this application. In this application, the uplink control information may include one or more of HARQ feedback, a P-CSI, or an SP-CSI.

It should be noted that an operation implemented by the terminal device in the following embodiments may be alternatively implemented by a processor, a chip or a chip system, a functional module, or the like in the terminal device; and an operation implemented by the network device in the following embodiments may be alternatively implemented by a processor, a chip or a chip system, a functional module, or the like in the network device.

Figure 2:
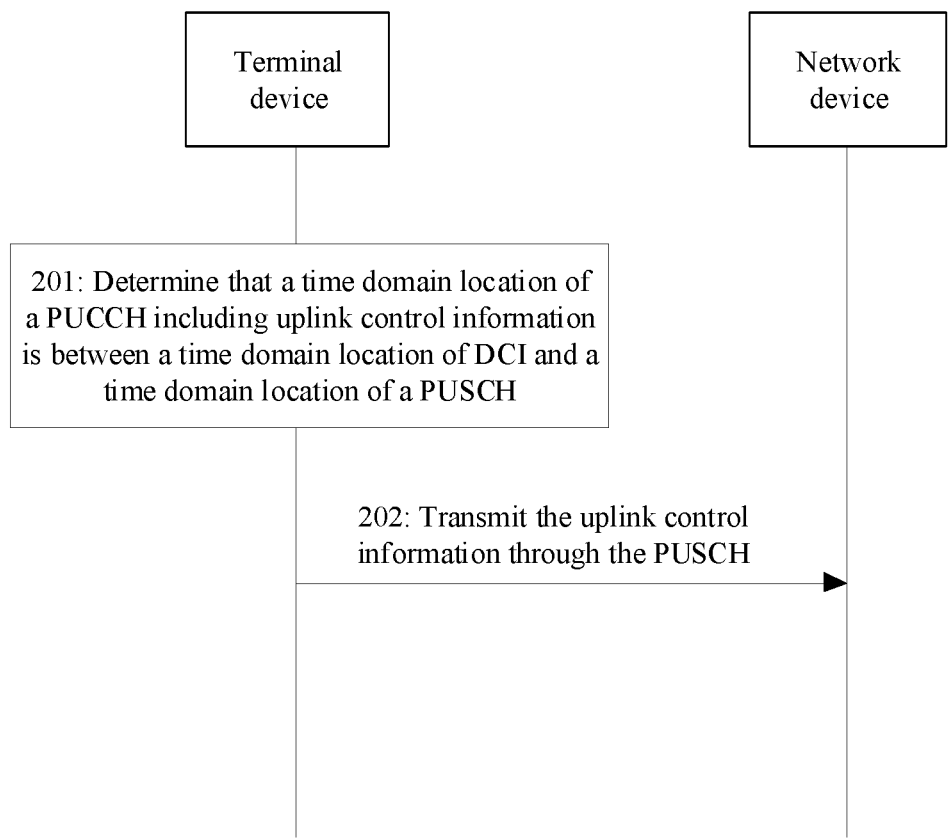
FIG. 2 is a flowchart of an uplink control information transmission method according to this application.

Based on the foregoing description, the uplink control information transmission method provided in embodiments of this application is applicable to the communication system shown in FIG. 1. As shown in FIG. 2, a specific procedure of the method may include the following steps.

Step 201: A terminal device determines that a time domain location of a PUCCH including uplink control information is between a time domain location of DCI and a time domain location of a PUSCH. The DCI is used to schedule transmission of the PUSCH.

The uplink control information may include one or more of HARQ feedback, a P-CSI report, or an SP-CSI report.

Step 202: The terminal device transmits the uplink control information to the network device through the PUSCH. In other words, the network device receives the uplink control information transmitted by the terminal device through the PUSCH.

Specifically, the terminal device transmits the uplink control information to the network device through the PUSCH. To be specific, the terminal device transmits both the uplink control information and information on the PUSCH to the network device through the PUSCH.

When the network device receives the uplink control information transmitted by the terminal device through the PUSCH, the network device also needs to determine that the time domain location of the PUCCH including the uplink control information is between the time domain location of the DCI and the time domain location of the PUSCH.

Specifically, when the terminal device transmits the uplink control information to the network device through the PUSCH, the terminal device no longer sends the PUCCH.

Figure 3:
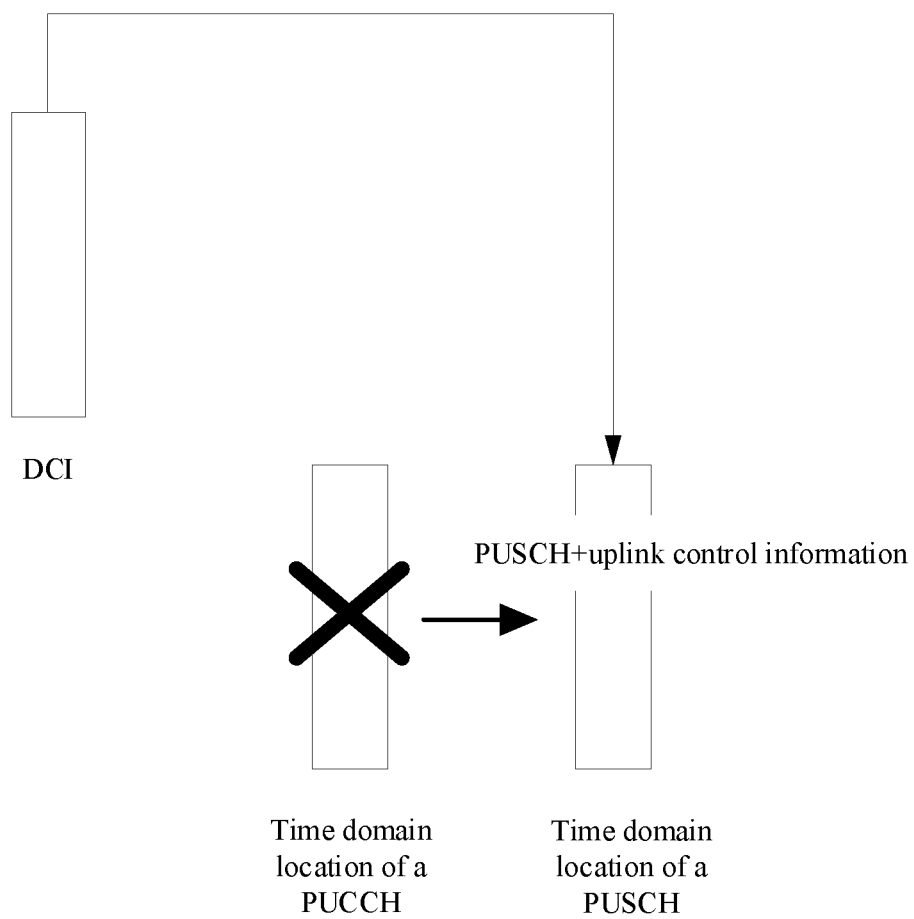
FIG. 3 is a schematic diagram of a type of transmission of uplink control information according to this application.

For example, when the method shown in FIG. 2 is used, a schematic diagram of transmission of the uplink control information may be shown in FIG. 3.

In the foregoing method, when the terminal device transmits the uplink control information to the network device through the PUSCH, the terminal device may send only the PUSCH but not the PUCCH. In other words, two times of uplink transmission are reduced to one time of uplink transmission, thereby reducing power consumption of the terminal device.

Because the PUSCH is dynamically scheduled by using the DCI, to ensure that the uplink control information can be combined onto the PUSCH (namely, ensure that the uplink control information is transmitted through the PUSCH), the terminal device needs to determine that a PUSCH is transmitted near the PUCCH. In other words, the terminal device determines that step 201 is met for the time domain location of the PUCCH and the time domain location of the PUSCH. If the time domain location of the DCI is after the time domain location of the PUCCH, the terminal device cannot predict that the PUSCH is transmitted near the PUCCH. To ensure that the terminal device can send the uplink control information to the network device, only the PUSCH can be selected to send the uplink control information. Therefore, the time domain location of the DCI needs to be located before the time domain location of the PUCCH.

Figure 4:
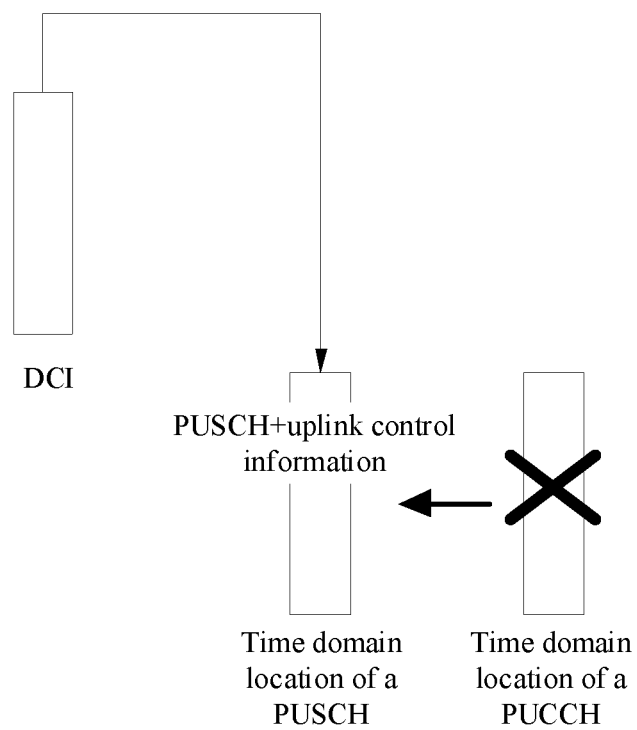
FIG. 4 is a schematic diagram of another type of transmission of uplink control information according to this application.

In addition, as shown in FIG. 4, if both the time domain location of the DCI and the time domain location of the PUSCH scheduled by using the DCI are before the time domain location of the PUCCH, it means that a time domain location for transmission of the uplink control information needs to be advanced from the time domain location of the PUCCH to the time domain location of the PUSCH. It takes a specific period of time for the terminal device to generate the uplink control information. For example, when generating HARQ feedback, the terminal device needs to decode and check downlink data, to determine whether the data is correctly transmitted and determine whether to generate an acknowledgment (ACK) or a negative acknowledgment (NACK). For another example, when generating a CSI report, the terminal device needs to receive a CSI-RS, process the received signal, and generate a report. Therefore, as shown in FIG. 4, if the uplink control information is transmitted in advance, it may not be ensured that the terminal device has enough processing time to generate the uplink control information. Therefore, the time domain location of the PUSCH usually needs to be located after the time domain location of the PUCCH.

In an optional implementation, a time domain length between the time domain location of the DCI and the time domain location of the PUCCH may be greater than or equal to a fourth time domain length.

Figure 5:
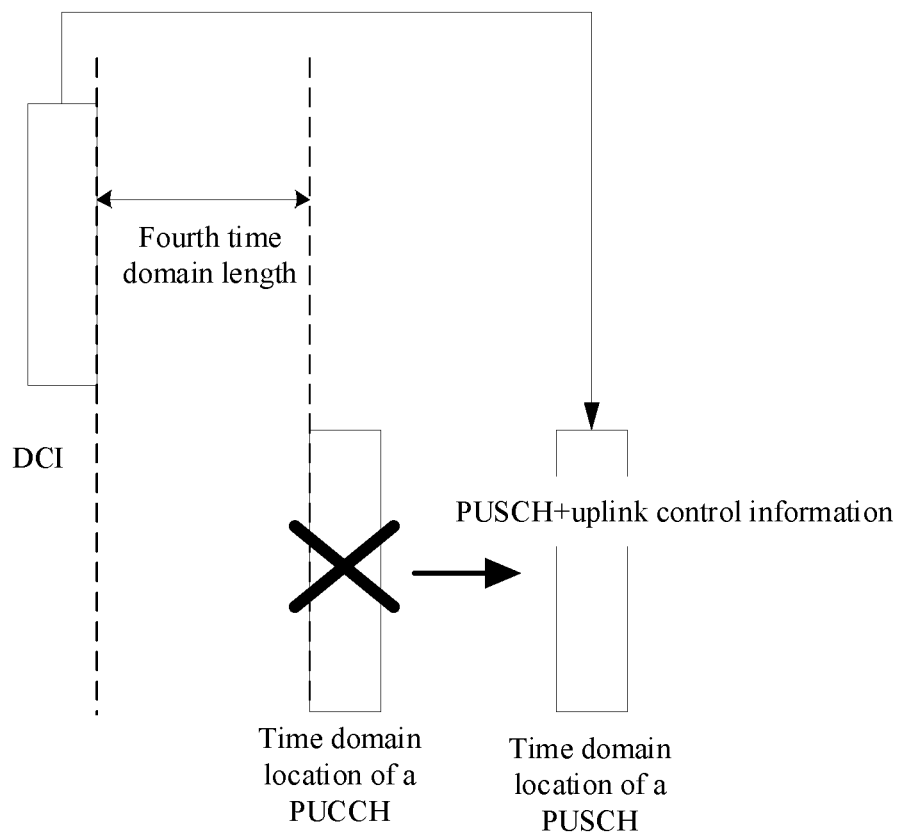
FIG. 5 is a schematic diagram of another type of transmission of uplink control information according to this application.

Specifically, a time domain length between an end location of the time domain location of the DCI and a start location of the time domain location of the PUCCH may be greater than or equal to the fourth time domain length. For example, the fourth time domain length may be shown in a schematic diagram of transmission of uplink control information shown in FIG. 5.

For example, the end location may be an end symbol or the like, and the start location may be a start symbol or the like. This is not limited in this application. It should be noted that an end location and a start location mentioned in the following description are similar to those mentioned above. Details are not described in the following.

A purpose of the fourth time domain length is to ensure that the terminal device can have enough time to complete DCI decoding, so that the terminal device learns whether PUSCH scheduling is performed subsequently. If a distance between the time domain location of the DCI and the time domain location of the PUCCH is relatively small, the terminal device may not complete DCI decoding, and cannot learn whether the PUSCH is transmitted near the PUCCH. To ensure that the uplink control information can be sent to the network device, the uplink control information can be transmitted only through the PUCCH. Therefore, to transmit the uplink control information through the PUSCH, a time domain location gap between the DCI and the PUCCH may be ensured to meet a limitation of the fourth time domain length.

In an example, the fourth time domain length may be one or more symbols, or one or more slots.

In another example, when the network device configures or indicates a minimum scheduling offset for the terminal device, the fourth time domain length may be equal to a currently effective minimum value of K0 (K0min).

In a specific embodiment, the fourth time domain length may be predefined in a standard, or may be configured by the network device for the terminal device, or may be determined by the terminal device and then reported to the network device.

In another optional implementation, a time domain length between the time domain location of the PUCCH and the time domain location of the PUSCH may be less than or equal to a fifth time domain length.

Figure 6:
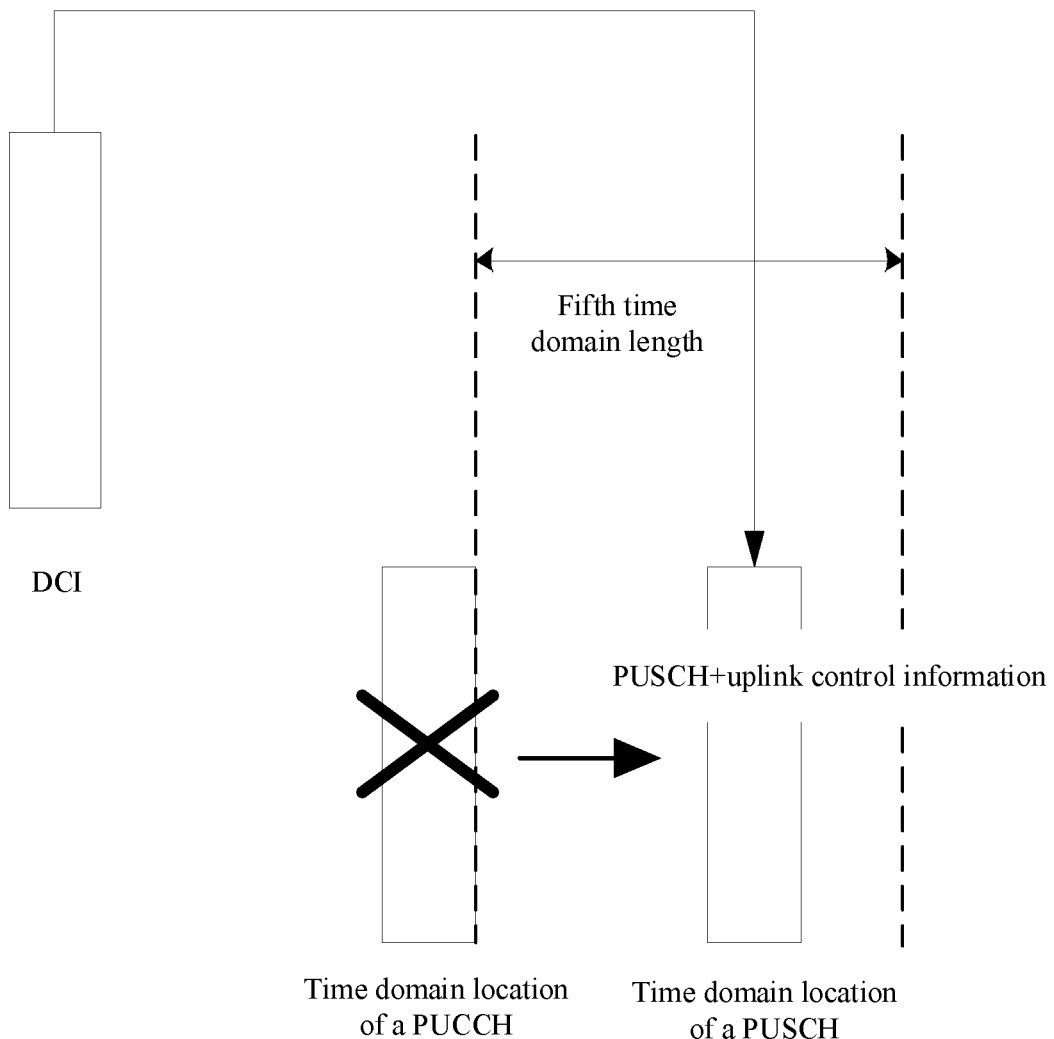
FIG. 6 is a schematic diagram of another type of transmission of uplink control information according to this application.

Specifically, a time domain length between an end location of the time domain location of the PUCCH and a start location of the time domain location of the PUSCH may be less than or equal to the fifth time domain length. For example, the fifth time domain length may be shown in a schematic diagram of transmission of uplink control information shown in FIG. 6.

The fifth time domain length is used, so that a transmission latency of the uplink control information can be controlled when the uplink control information is transmitted through the PUSCH. For example, the fifth time domain length may be a maximum value of an additional transmission latency in transmission of the uplink control information when the uplink control information is transmitted through the PUSCH. A purpose of the fifth time domain length is to avoid a relatively large transmission latency of the uplink control information. When the uplink control information is sent through the subsequent PUSCH, sending time of the uplink control information is delayed. As a result, an entire communication latency is increased. To control a range of the communication latency, a time domain range in which sending of the uplink control information can be delayed may be limited by using the fifth time domain length.

In an example, the fifth time domain length may also be one or more symbols, or one or more slots.

Similarly, the fifth time domain length may also be predefined in a standard, or may be configured by the network device for the terminal device, or may be determined by the terminal device and then reported to the network device.

In an example implementation, when there is at least one another PUCCH including uplink control information between the time domain location of the current PUCCH and the time domain location of the PUSCH, the terminal device may transmit both the uplink control information on the current PUCCH and at least one another piece of uplink control information to the network device through the PUSCH.

Figure 7:
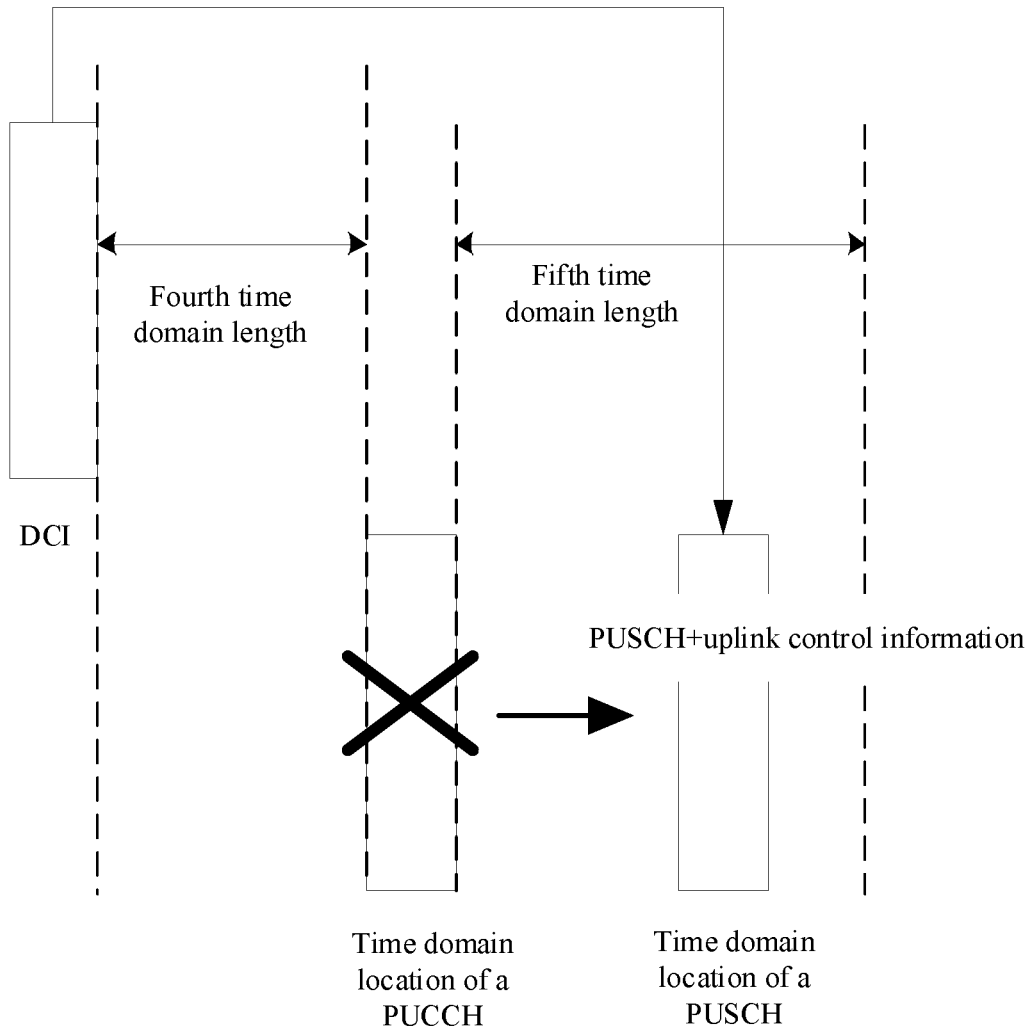
FIG. 7 is a schematic diagram of another type of transmission of uplink control information according to this application.

In an optional implementation, the time domain length between the time domain location of the DCI and the time domain location of the PUCCH is greater than or equal to the fourth time domain length. In addition, the time domain length between the time domain location of the PUCCH and the time domain location of the PUSCH is less than or equal to the fifth time domain length. An example is shown in FIG. 7.

In an optional implementation, when the uplink control information includes a P-CSI report or an SP-CSI report, and the DCI triggers an AP-CSI report, the terminal device performs step 202 only when report content of the P-CSI report or the SP-CSI report included in the uplink control information is different from report content of the AP-CSI report included on the PUSCH. That the report content is different may be that the report content is completely different, or the report content is not completely the same. It should be noted that this implementation may be used in combination with the foregoing method related to the fourth time domain length and/or the fifth time domain length.

Specifically, when configuring related configuration information of the CSI report for the terminal device, the network device configures a parameter report content (reportQuantity). The parameter is used to indicate a type of channel state information carried in the current CSI report. In some embodiments, possible values of reportQuantity are as follows:

| reportQuantity | CHOICE { |
|---|---|
| none | NULL, |
| cri-RI-PMI-CQI | NULL, |
| cri-RI-i1 | NULL, |
| cri-RI-i1-CQI | SEQUENCE { |
| pdsch-BundleSizeForCSI | ENUMERATED {n2, n4} OPTIONAL -- Need S |
| }, | |
| cri-RI-CQI | NULL, |
| cri-RSRP | NULL, |
| ssb-Index-RSRP | NULL, |
| cri-RI-LI-PMI-CQI | NULL |
| }. | |

Because the P-CSI report or the SP-CSI report and the AP-CSI report are both CSI reports sent by the terminal device, functions may overlap to some extent. If the terminal device sends a CSI report twice, performance may not be significantly improved, but power consumption of the terminal device may be caused. Therefore, to avoid repeated transmission of CSI reports having a same function (to be specific, transmission is performed once through the PUCCH carrying the P-CSI report or the SP-CSI report, and then transmission is performed once through the PUSCH carrying the AP-CSI report), one time of the transmission of the CSI report may be canceled. To avoid impact on performance to greatest extent, in this application, the terminal device performs step 202 only when the report content (reportQuantity) of the P-CSI report or the SP-CSI report included in the uplink control information is different from the report content of the AP-CSI report included on the PUSCH.

In an optional implementation, when the report content of the P-CSI report or the SP-CSI report is fully or partially the same as the report content of the AP-CSI report, the terminal device drops information on the PUCCH. In other words, the terminal device cancels transmission of the PUCCH, namely, the terminal device no longer sends the information (namely, the uplink control information) on the PUCCH.

Figure 8:
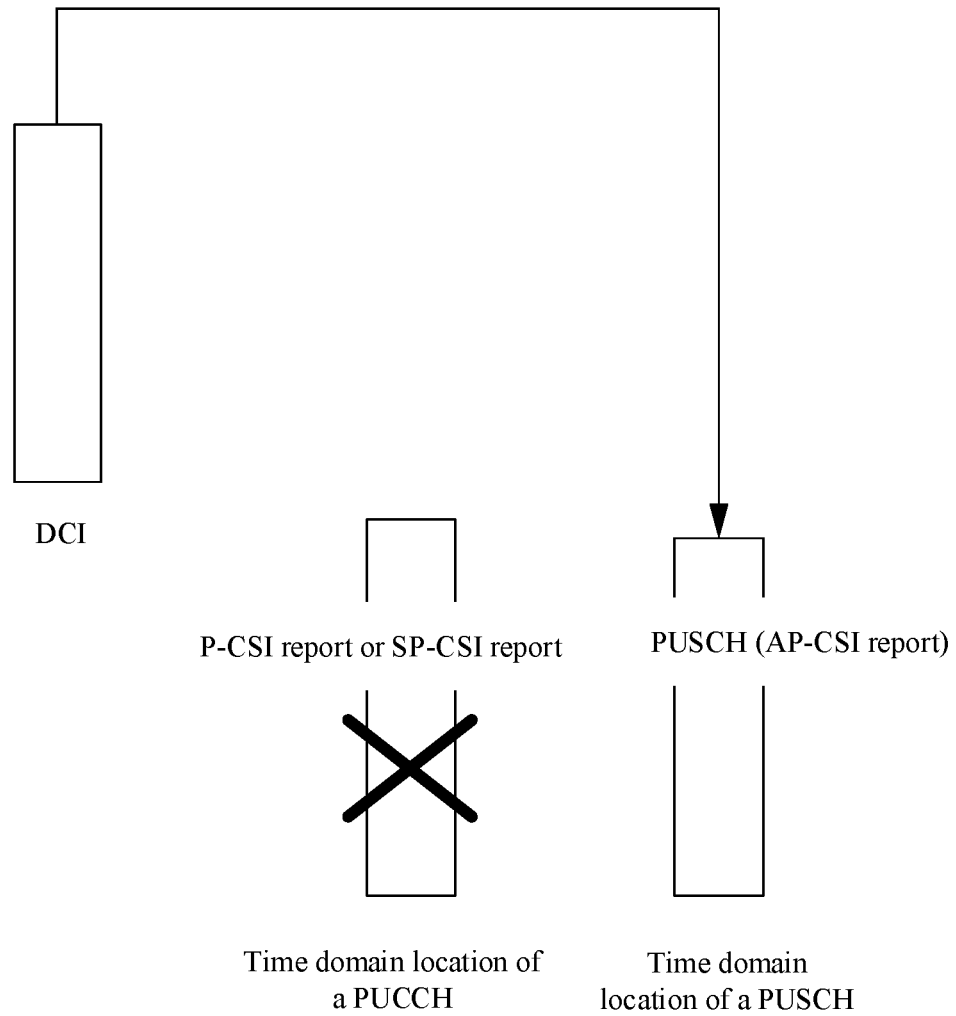
FIG. 8 is a schematic diagram of another type of transmission of uplink control information according to this application.

In another optional implementation, as shown in FIG. 8, when the uplink control information includes the P-CSI report or the SP-CSI report, and the DCI triggers the AP-CSI report, the terminal device may not determine whether the report content of the P-CSI report or the SP-CSI report is the same as the report content of the AP-CSI report, and directly drop the information on the PUCCH, namely, no longer send the P-CSI report or the SP-CSI report on the PUCCH.

In a specific implementation, that the terminal device transmits the uplink control information to the network device through the PUSCH may specifically include the following two methods:

Method a1: The terminal device performs bit concatenation on the uplink control information and information included on the PUSCH to obtain first information, and transmits the first information to the network device through the PUSCH.

Specifically, in the method a1, the terminal device may multiplex the uplink control information onto the PUSCH, to be specific, perform bit concatenation on the uplink control information and the information included on the PUSCH; and then modulate and map the uplink control information and the information included on the PUSCH together to physical resources of the PUSCH to obtain the first information.

Method a2: The terminal device punctures the PUSCH, maps the uplink control information to a punctured location of the PUSCH to obtain second information, and transmits the second information to the network device through the PUSCH. The second information includes the uplink control information mapped to the punctured location of the PUSCH and information at an unpunctured location of the PUSCH.

Specifically, in the method a2, the terminal device separately modulates the uplink control information. After puncturing the PUSCH, the terminal device replaces modulated symbols on some resource elements (REs) occupied by the punctured PUSCH with modulated symbols obtained after the uplink control information is modulated, to obtain the second information.

Optionally, when the terminal device punctures the PUSCH, the punctured location of the PUSCH may be predefined. For example, in time domain, the terminal device may start puncturing from a first symbol occupied by the PUSCH, or the terminal device may start puncturing from a first symbol other than a demodulation reference signal (DMRS) on the PUSCH; and in frequency domain, the terminal device may start puncturing from a start RE occupied by the PUSCH. Two punctured REs may be spaced by h REs. Herein, h may be a predefined value. Certainly, there may be another possibility for the punctured location of the PUSCH, provided that information at the punctured location of the PUSCH has relatively small impact on data transmission. This is not limited in this application.

It should be noted that, in addition to the method a1 and the method a2, there may be another method. This is not listed one by one herein in this application.

The method a1 and the method a2 may be predefined in a standard, or may be configured by the network device for the terminal device. Alternatively, the terminal device may further determine to use the method a1, the method a2, or another method based on a condition. Specifically, the following three methods may be included:

Method b1: When the time domain length between the time domain location of the PUCCH and the time domain location of the PUSCH is greater than or equal to the sixth time domain length, the foregoing method a1 is used; or otherwise, the foregoing method a2 is used.

Specifically, whether the time domain length between the time domain location of the PUCCH and the time domain location of the PUSCH is greater than or equal to the sixth time domain length may be represented by whether the time domain length between the end location of the time domain location of the PUCCH and the start location of the time domain location of the PUSCH is greater than or equal to the sixth time domain length.

The sixth time domain length is used to enable the terminal device to reserve enough processing time when the terminal device needs to jointly modulate the uplink control information and uplink data.

In an example, the sixth time domain length may also be one or more symbols, or one or more slots.

Figure 9:
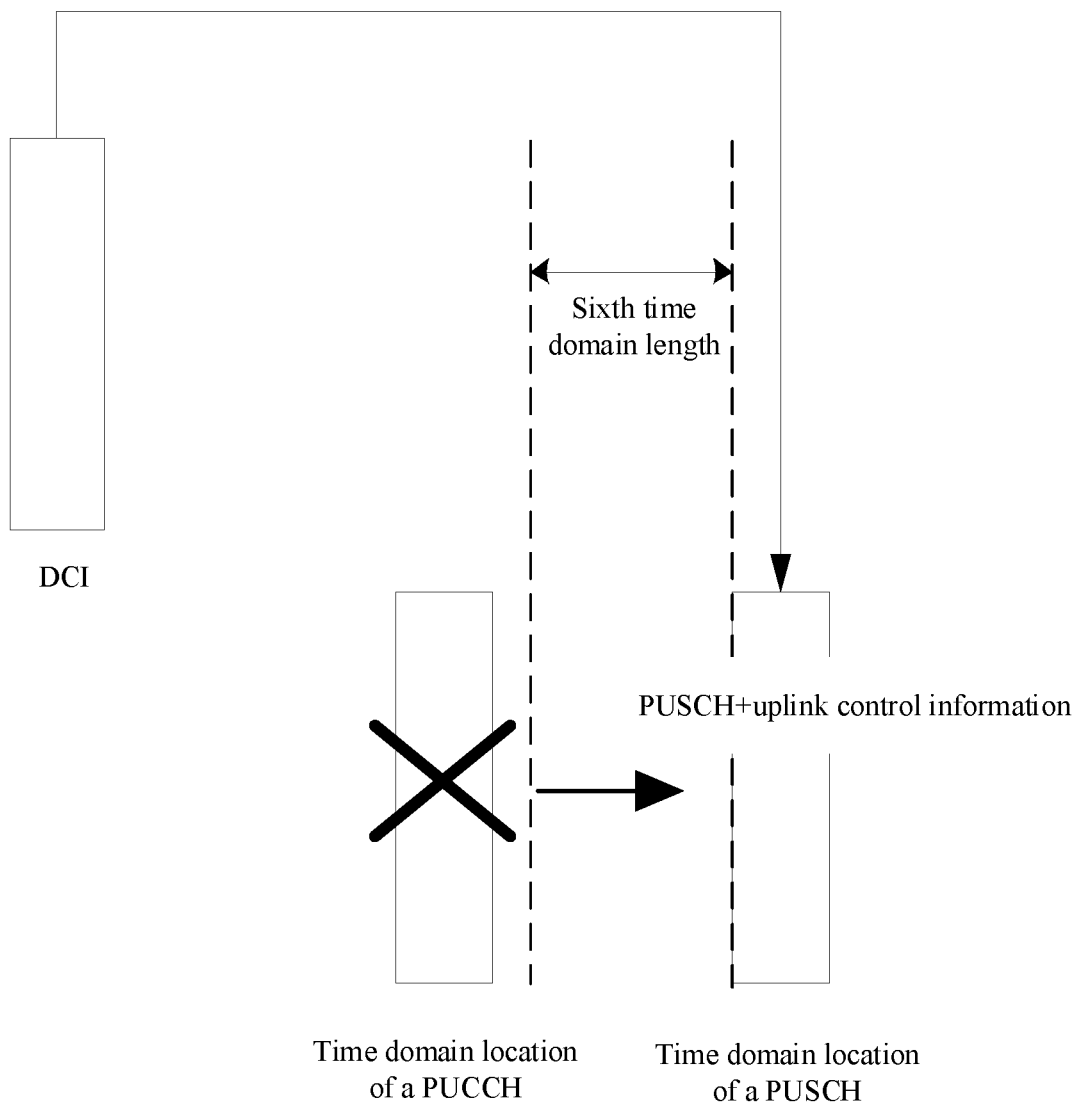
FIG. 9 is a schematic diagram of another type of transmission of uplink control information according to this application.

For example, a schematic diagram in which the time domain length between the time domain location of the PUCCH and the time domain location of the PUSCH is greater than or equal to the sixth time domain length may be shown in FIG. 9.

If the foregoing method a1 is used, joint modulation needs to be performed on the uplink control information and the uplink data. Therefore, enough time needs to be reserved for the terminal device. However, when the foregoing method a2 is used, the uplink control information and the uplink data are separately modulated. Even if the time domain location of the PUCCH is relatively close to the time domain location of the PUSCH, generation of a signal of the PUSCH is not affected by processing of the uplink control information, and some REs need to be replaced when the information included on the PUSCH is sent. Therefore, the manner of the foregoing method a2 takes shorter time. It can be learned that whether to use the method a1 or the method a2 may be determined in the manner in the method b1.

Similarly, the sixth time domain length may also be predefined in a standard, or may be configured by the network device for the terminal device, or may be determined by the terminal device and then reported to the network device.

Method b2: When the time domain length between the time domain location of the PUCCH and the time domain location of the PUSCH is greater than or equal to a seventh time domain length, the foregoing method a1 is used. Otherwise, the method in step 202 is not performed. In other words, the uplink control information is not transmitted through the PUSCH, and the uplink control information is directly transmitted through the PUCCH in an existing manner.

The seventh domain length is used to enable the terminal device to reserve enough processing time when the terminal device needs to jointly modulate the uplink control information and the uplink data.

In an example, the seventh time domain length may be the same as the sixth time domain length.

Method b3: When a quantity of information bits of the uplink control information is greater than or equal to the first value, the foregoing method a1 is used. When a quantity of information bits of the uplink control information is less than the first value, the foregoing method a2 is used.

Specifically, when the method a2 is used, some REs on the PUSCH are directly replaced with the modulated symbols obtained after the uplink control information is modulated. This is equivalent to a case in which a part of the uplink data is damaged. After channel encoding is performed on the uplink data, a part of redundant information is introduced.

Due to the addition of the redundant information, even if a part of the PUSCH after encoding and modulation is damaged, all original information can still be restored when the damaged part accounts for a relatively small proportion. Therefore, when the quantity of information bits of the uplink control information is relatively small, even if the uplink control information is sent together with the uplink data in the manner of the foregoing method a2, both the uplink control information and the uplink data can be correctly transmitted. However, when the quantity of information bits of the uplink control information is relatively large, transmission of the uplink data may fail when the foregoing method a2 is used. Therefore, the first value is introduced. The method a2 is used when the quantity of information bits of the uplink control information is less than the first value, thereby reducing a transmission failure probability.

The first value may be predefined, or may be configured by the network device for the terminal device. A value of the first value is used provided that the uplink control information can be successfully transmitted through the PUSCH.

In a specific implementation, the method b1 and the method b3 may be combined to determine whether to use the method a1 or the method a2.

Currently, when the uplink control information is separately transmitted through the PUCCH and the uplink data is separately transmitted through the PUSCH, the terminal device needs to send a signal twice. Although transmit power consumption of the terminal device is relatively high, average allocated energy per bit in the two signals is also relatively high, so that high noise can be resisted, and a coverage area of the signal is relatively large. However, when the uplink control information is transmitted through the PUSCH by using the method in this application, for the uplink control information or information such as data or an AP-CSI report on the PUSCH, average allocated energy per bit is relatively low. In this case, the coverage area of the signal may be limited, and signal transmission reliability is reduced. To resolve a problem of signal transmission reliability, the signal transmission reliability can be ensured by using the following several methods in this application.

Method c1: The terminal device performs step 202 only when a reference signal received power (RSRP) sent by the terminal device to the network device is greater than an RSRP threshold.

The terminal device calculates an RSRP value based on a power of a reference signal (for example, a synchronization signal block and a broadcast channel block (synchronization signal block (SSB) and physical broadcast channel (PBCH) block), or a CSI-RS) received from the network device. A greater RSRP value indicates a closer distance between the terminal device and the network device. The RSRP threshold is equivalent to an equivalent distance threshold from the network device to the terminal device. When the RSRP corresponding to the reference signal received by the terminal device is greater than the RSRP threshold, it indicates that the terminal device is close enough to the network device. In this case, even if the terminal device sends the uplink control information through the PUSCH, it can still be ensured that a signal can be correctly transmitted. When the RSRP reported by the terminal device to the network device is greater than the RSRP threshold, it may be considered that coverage of the terminal device is not limited. In this case, the uplink control information may be transmitted in the manner in step 202.

For example, when the RSRP does not meet the condition in the method c1, the uplink control information may be transmitted in a common manner. In other words, the uplink control information is separately transmitted.

It should be noted that the uplink control information is transmitted by using the manner in step 202 only when both the terminal device and the network device determine that the RSRP is greater than the RSRP threshold. Therefore, only by comparing the RSRP sent by the terminal device to the network device with the RSRP threshold, the terminal device and the network device can both determine whether the condition is met.

Method c2: When the terminal device transmits the uplink control information to the network device through the PUSCH, the terminal device transmits the uplink control information to the network device through the PUSCH by using a first transmit power.

The first transmit power may be determined in the following two manners:

In a first manner, the first transmit power may be obtained by adding X decibels (dB) to an original transmit power of the PUSCH. A value of X may be predefined in a standard, or may be preconfigured by the network device for the terminal device, or may be indicated by the network device by using signaling (for example, DCI). This is not limited in this application.

In a second manner, the first transmit power may be determined based on an original transmit power of the PUSCH and an original transmit power of the PUCCH. For example, the first transmit power may be obtained by adding the original transmit power of the PUSCH and the original transmit power of the PUCCH, or the first transmit power may be obtained by multiplying a sum of the original transmit power of the PUSCH and the original transmit power of the PUCCH by a coefficient. For example, if the original transmit power of the PUCCH is 16 decibels above one milliwatt (dBm), and the original transmit power of the PUSCH is 16 dBm, the first transmit power may be a sum of the two powers, namely, 19 dBm; or the first transmit power may be obtained by multiplying a sum of the two powers by a coefficient, namely, 18 dBm. Certainly, the first transmit power may also be obtained by using another method. This is not limited in this application.

It should be understood that the foregoing two manners are both used to increase a transmit power. In some embodiments, the transmit power of the PUSCH may be determined based on a path loss value estimated by the terminal device, a transmission parameter configured by the network device, and a transmit power control (TPC) command indicated by the network device in DCI. To improve transmission reliability of the uplink control information and the uplink data or the AP-CSI report, the manner in the foregoing method c2 may be used to increase the transmit power of the PUSCH, thereby increasing the average allocated energy per bit.

Method c3: The terminal device performs step 202 only when a quantity of bits of the uplink control information is less than or equal to a second value. In the method c3, a decrease degree of the average allocated energy per bit is controlled, and the uplink control information is transmitted in the manner in step 202 only when transmission can be ensured.

The second value may be predefined, or may be configured by the network device for the terminal device. A value of the second value is used provided that it can be ensured that the uplink control information can be transmitted through the PUSCH.

Method c4: When the terminal device transmits the uplink control information to the network device through the PUSCH, the terminal device may determine first K bits in descending order of priorities of bits in the uplink control information when determining that the quantity of bits of the uplink control information is greater than M. The terminal device transmits the K bits to the network device through the PUSCH, where K is less than or equal to M.

For example, M is the second value in the method c3.

Specifically, when the terminal device transmits the uplink control information to the network device through the PUSCH, and the network device receives the uplink control information transmitted by the terminal device through the PUSCH, both parties need to negotiate to reach a consensus, to jointly enable or disable the function. For example, enabling of the function may be configured in the following four manners.

Manner d1: The terminal device receives a first message from the network device. The first message is used to configure or enable a function of transmitting the uplink control information through the PUSCH by the terminal device.

The first message is configuration information sent by the network device to the terminal device. For example, the first message may be sent by using radio resource control (RRC) signaling or medium access control (MAC) control elements (CEs) (MAC CEs).

Figure 10:
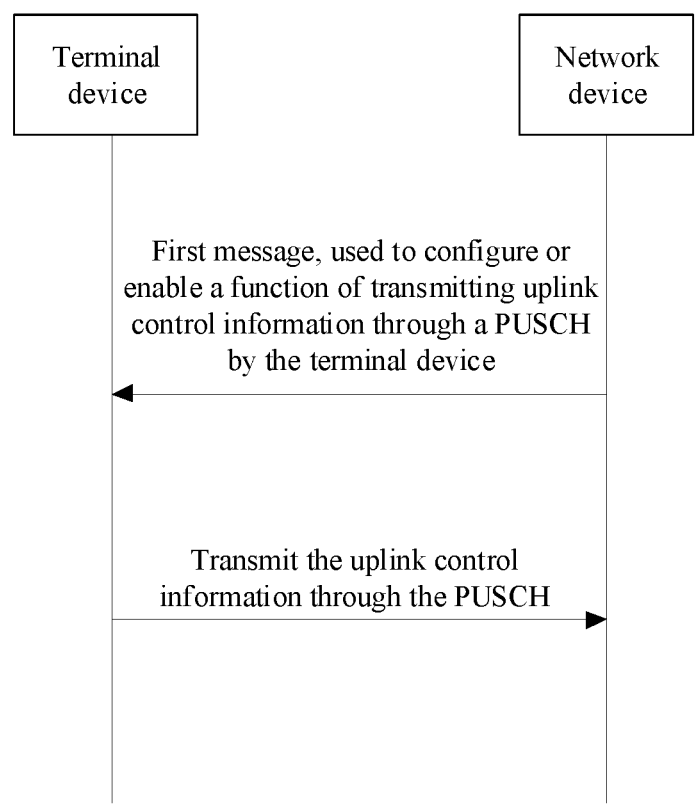
FIG. 10 is a schematic flowchart of a type of transmission of uplink control information according to this application.

According to the foregoing method, when the time domain location of the PUCCH and the time domain location of the PUSCH meet step 201, the terminal device may send the uplink control information through the PUSCH, and the network device may receive the uplink control information through the PUSCH. For example, a specific procedure may be shown in FIG. 10.

Figure 11:
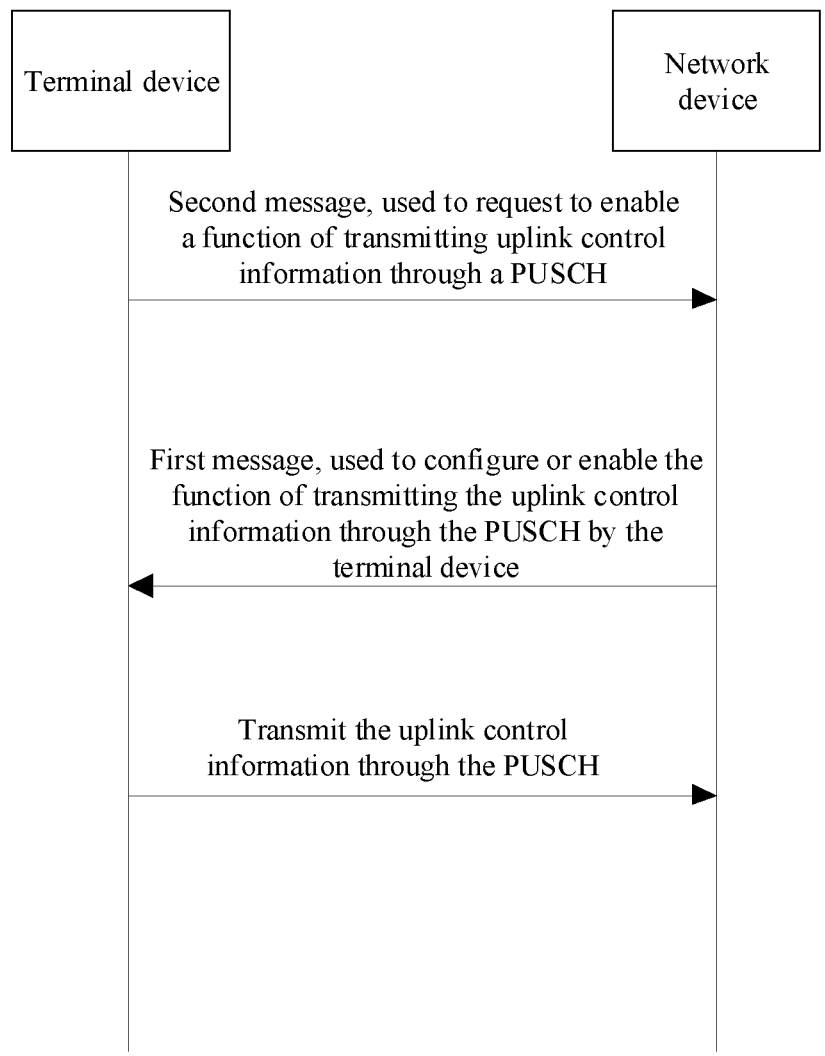
FIG. 11 is a schematic flowchart of another type of transmission of uplink control information according to this application.

Manner d2: The terminal device sends a second message to the network device. The second message is used to request to enable a function of transmitting the uplink control information through the PUSCH. Then, the terminal device receives a first message from the network device. The first message is used to configure or enable the function of transmitting the uplink control information through the PUSCH by the terminal device. Then, when the time domain location of the PUCCH and the time domain location of the PUSCH meet step 201, the terminal device may send the uplink control information through the PUSCH, and the network device may receive the uplink control information through the PUSCH. For example, a specific procedure may be shown in FIG. 11.

Figure 12:
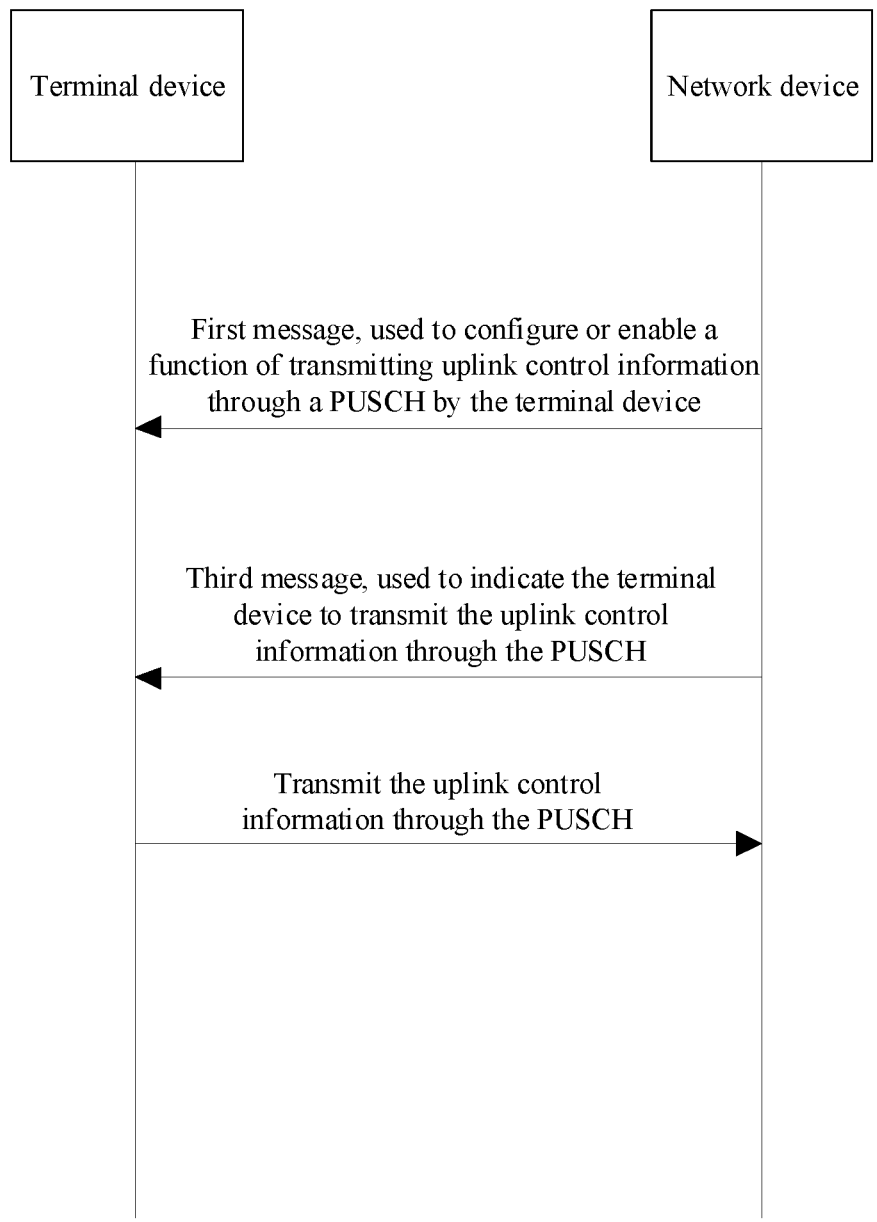
FIG. 12 is a schematic flowchart of another type of transmission of uplink control information according to this application.

Manner d3: The terminal device receives a first message from the network device. The first message is used to configure or enable a function of transmitting the uplink control information through the PUSCH by the terminal device. Then, the terminal device receives a third message from the network device. The third message is used to indicate the terminal device to transmit the uplink control information through the PUSCH. Then, when the time domain location of the PUCCH and the time domain location of the PUSCH meet step 201, the terminal device may send the uplink control information through the PUSCH, and the network device may receive the uplink control information through the PUSCH. For example, a specific procedure may be shown in FIG. 12.

In the manner d3, after sending configuration information (namely, the first message) to the terminal device, the network device further needs to send dynamic indication information, namely, the third message (for example, DCI) to the terminal device, to indicate whether the terminal device can transmit the uplink control information through the PUSCH. For example, the third message may be added to the DCI of the PUSCH scheduled by the network device, to indicate whether uplink control information in another PUCCH can be transmitted through the current PUSCH.

Figure 13:
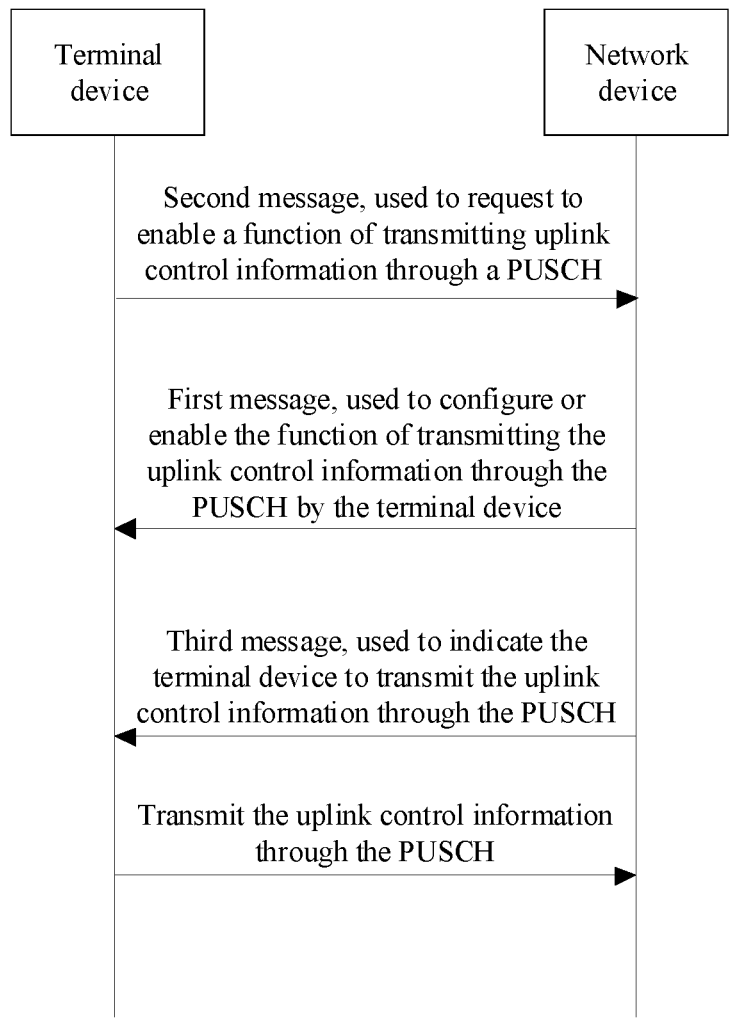
FIG. 13 is a schematic flowchart of another type of transmission of uplink control information according to this application.

Manner d4: The terminal device sends a second message to the network device. The second message is used to request to enable a function of transmitting the uplink control information through the PUSCH. Then, the terminal device receives a first message from the network device. The first message is used to configure or enable the function of transmitting the uplink control information through the PUSCH by the terminal device. Then, the terminal device receives a third message from the network device. The third message is used to indicate the terminal device to transmit the uplink control information through the PUSCH. Finally, when the time domain location of the PUCCH and the time domain location of the PUSCH meet step 201, the terminal device may send the uplink control information through the PUSCH, and the network device may receive the uplink control information through the PUSCH. For example, a specific procedure may be shown in FIG. 13.

In other words, the manner d4 is a combination of the foregoing three manners. For specific description of messages, refer to the related description in the foregoing manners.

According to the uplink control information transmission method provided in this application, the uplink control information is transmitted through the PUSCH, so that a quantity of uplink transmission times can be reduced, thereby reducing power consumption of the terminal device.

Figure 14:
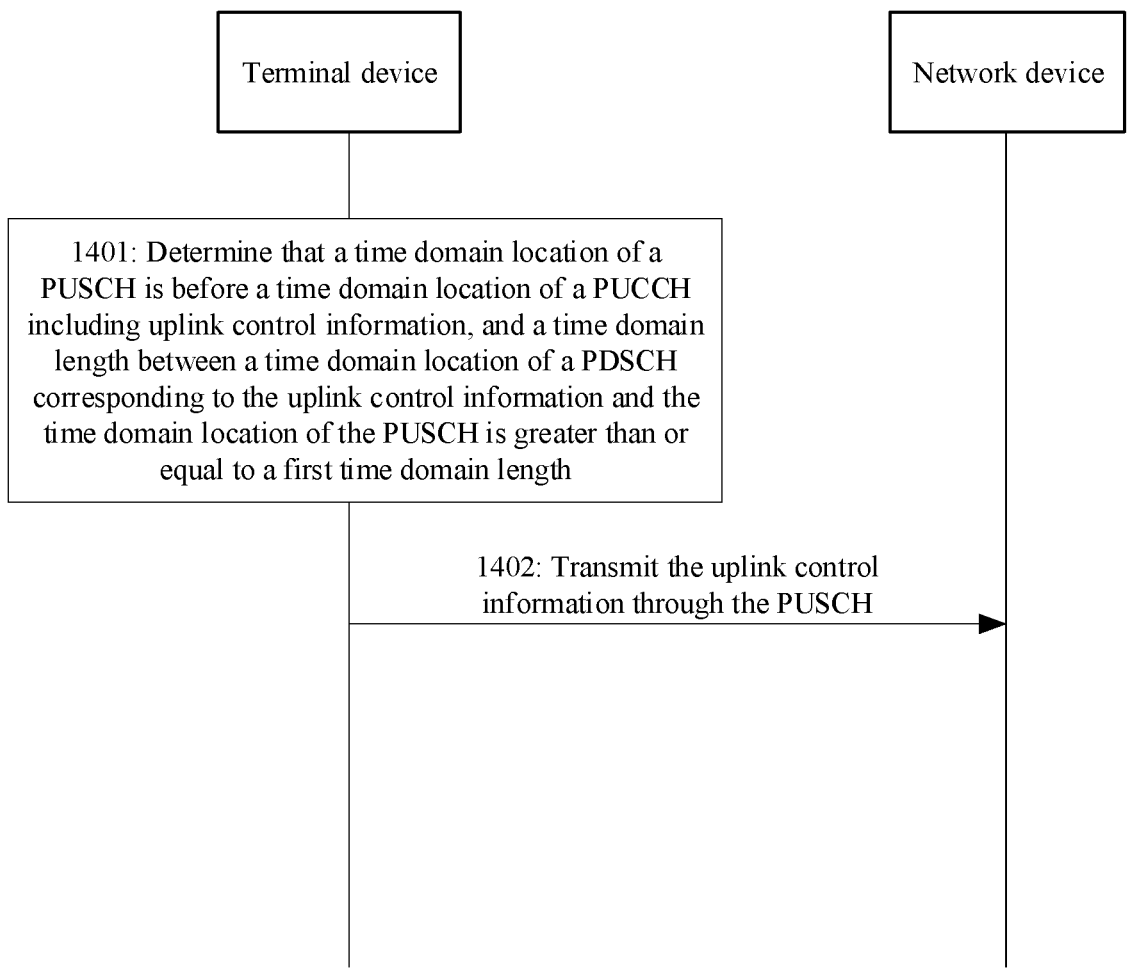
FIG. 14 is a flowchart of another uplink control information transmission method according to this application.

Based on the foregoing description, an embodiment of this application further provides another uplink control information transmission method. The method is applicable to the communication system shown in FIG. 1. As shown in FIG. 14, a specific procedure of the method may include the following steps.

Step 1401: A terminal device determines that a time domain location of a PUSCH is before a time domain location of a PUCCH including uplink control information, and a time domain length between a time domain location of a PDSCH corresponding to the uplink control information and the time domain location of the PUSCH is greater than or equal to a first time domain length.

The uplink control information may include HARQ feedback.

Step 1402: The terminal device transmits the uplink control information to a network device through the PUSCH. In other words, the network device receives the uplink control information transmitted by the terminal device through the PUSCH.

Similar to the embodiment shown in FIG. 2, when the terminal device transmits the uplink control information to the network device through the PUSCH, the terminal device no longer sends information on the PUCCH.

Figure 15:
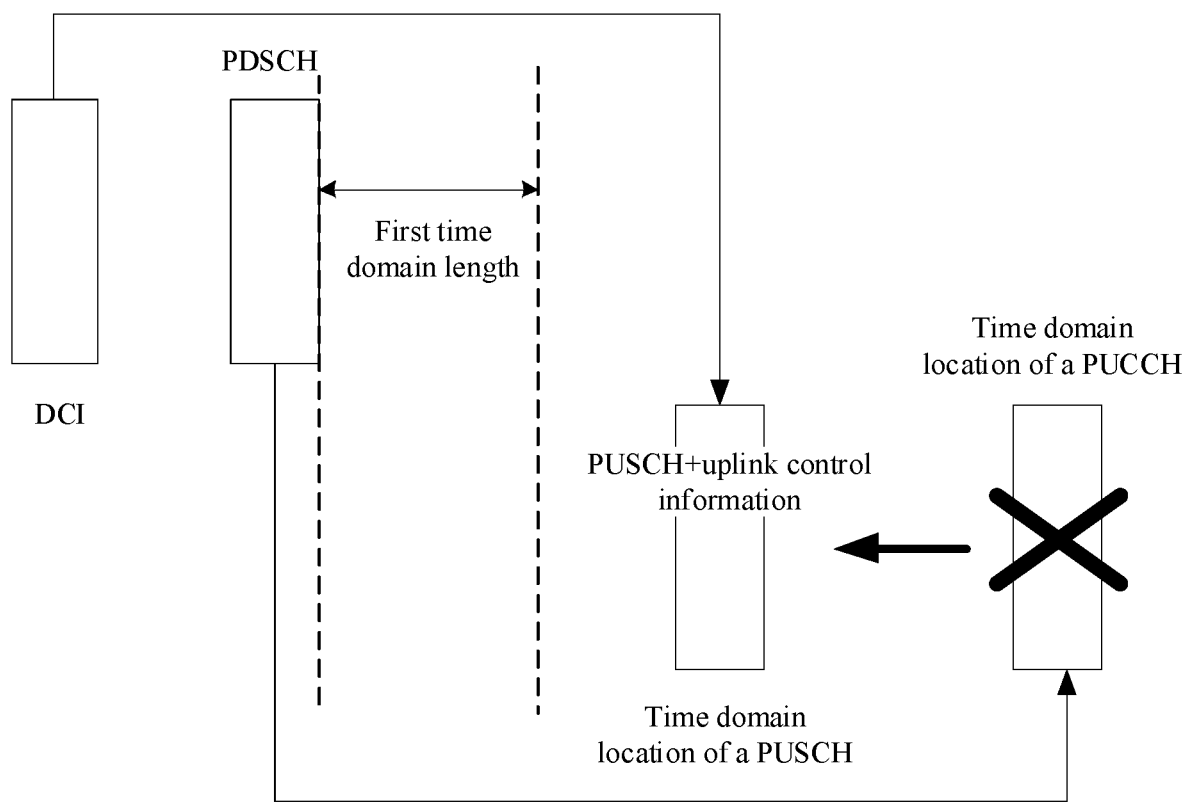
FIG. 15 is a schematic diagram of another type of transmission of uplink control information according to this application.

In this embodiment, it can be ensured based on a limitation of the first time domain length that the terminal device has enough time to decode the PDSCH and generate HARQ feedback information. For example, a schematic diagram of transmission of the uplink control information for which the first time domain length is limited may be shown in FIG. 15.

In a specific implementation, the first time domain length may be represented by $T_{proc,1}$ where $T_{proc,1}$ may satisfy the following Formula 1:

$$T_{proc,1}=(N_1+d_{1,1}+d_2)(2048+144)\cdot\kappa 2^{-\mu}\cdot T_c \qquad \text{Formula 1}$$

Herein, a value of $N_1$ in Formula 1 is related to subcarrier spacing (SCS) or a system parameter numerology. Herein, $N_1$ is a processing capability reported by the terminal device.

The terminal device may report "Capability 1" or "Capability 2". For a value of $N_1$, refer to the following Table 1 or Table 2.

TABLE 1

| | Capability 1 | |
|---|---|---|
| | $N_1$ | |
| μ | A value of dmrs-AdditionalPosition is pos0 | A value of dmrs-AdditionalPosition is not pos0 |
| 0 | 8 | $N_{1,0}$, where a value of $N_{1,0}$ is 13 or 14 |
| 1 | 10 | 13 |
| 2 | 17 | 20 |
| 3 | 20 | 24 |

TABLE 2

| | Capability 2 | |
|---|---|---|
| μ | $N_1$ A value of dmrs-AdditionalPosition is pos0 | |
| 0 | 3 | |
| 1 | 4.5 | |
| 2 | 9 | |

In Table 1 and Table 2, the parameter dmrs-AdditionalPosition is used to configure a time domain location of a demodulation reference signal (DMRS); pos0 is a value of the parameter, and may be interpreted as "a location 0"; and $d_{1,1}$ and $d_2$ are related to a PDSCH mapping type and a symbol length occupied by the PDSCH, and the like. μ is a numerology, $T_c = 1/(\Delta f_{max} \cdot N_f)$, $\Delta f_{max} = 480 \cdot 10^3$ Hz, and $N_f = 4096$; and $\kappa = T_s/T_c = 64$, $T_s = 1/(\Delta f_{ref} \cdot N_{f,ref})$, $\Delta f_{ref} = 15 \cdot 10^3$ Hz, and $N_{f,ref} = 2048$.

Specifically, a method in which the terminal device transmits the uplink control information to the network device through the PUSCH is similar to the method in which the terminal device transmits the uplink control information to the network device through the PUSCH in the embodiment shown in FIG. 2. For details, refer to the related description in the foregoing methods a1 to a3, b1 to b3, and c1 to c4. Details are not described herein again.

Optionally, in this embodiment, because the time domain location of the PUSCH is before the time domain location of the PUCCH including the uplink control information, when the terminal device transmits the uplink control information to the network device through the PUSCH, limitations in the foregoing methods b1 and b2 may not be used. In other words, in this embodiment, a bit concatenation (namely, the foregoing method a1) manner or a puncturing (namely, the foregoing method a2) manner may be used. This is not limited by the time domain length between the time domain location of the PUCCH and the time domain location of the PUSCH (in other words, a value relationship between the sixth time domain length or the seventh time domain length and the time domain length between the time domain location of the PUCCH and the time domain location of the PUSCH does not need to be considered).

Specifically, for a specific manner in which the network device configures, for the terminal device, capability information for transmitting the uplink control information through the PUSCH, also refer to the related description in the manners d1 to d4 in the embodiment shown in FIG. 2. Details are not described herein again.

According to the uplink control information transmission method provided in this application, the uplink control information is transmitted through the PUSCH, so that a quantity of uplink transmission times can be reduced, thereby reducing power consumption of the terminal device.

Figure 16:
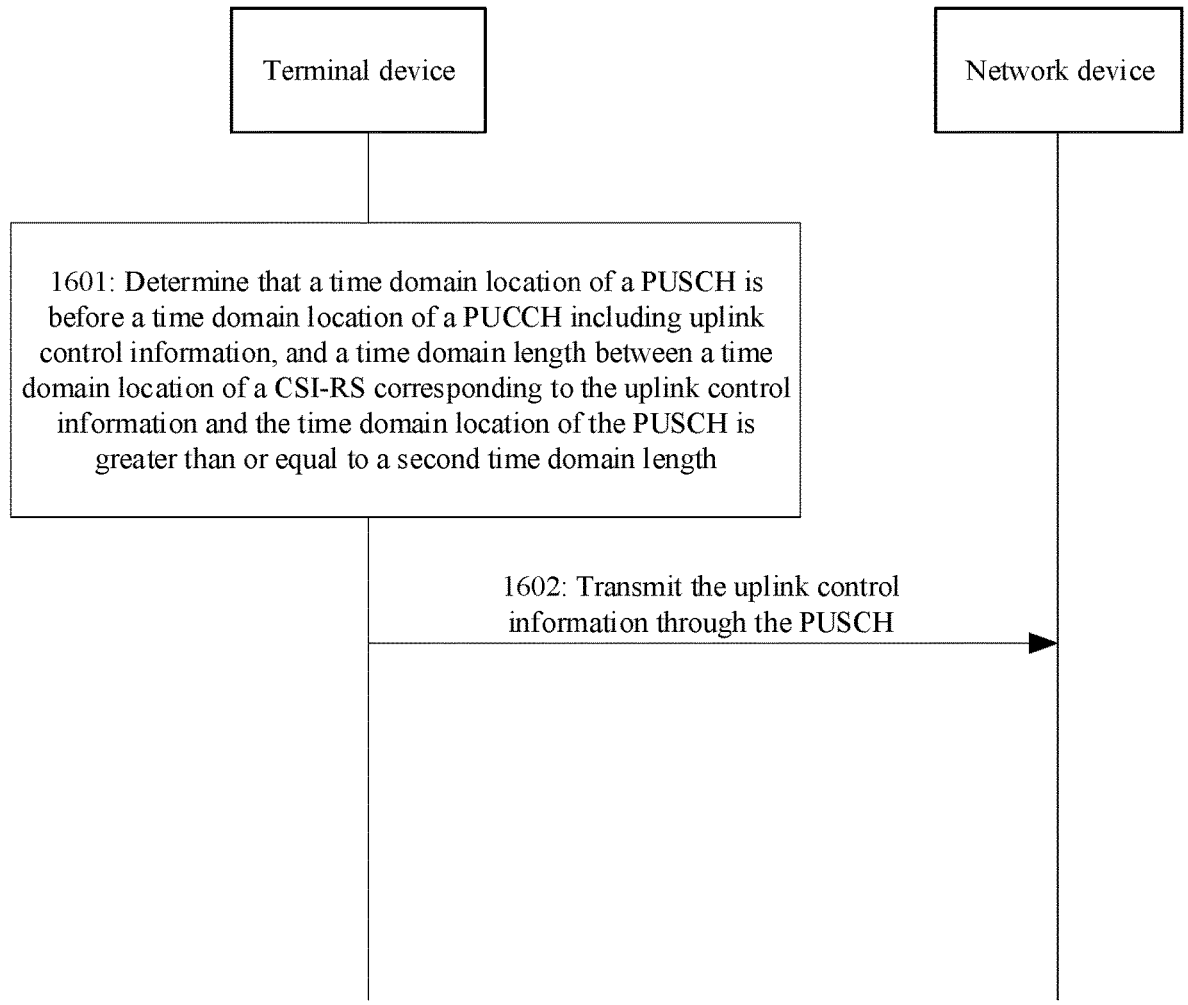
FIG. 16 is a flowchart of another uplink control information transmission method according to this application.

Based on the foregoing description, an embodiment of this application further provides another uplink control information transmission method. The method is applicable to the communication system shown in FIG. 1. As shown in FIG. 16, a specific procedure of the method may include the following steps.

Step 1601: A terminal device determines that a time domain location of a PUSCH is before a time domain location of a PUCCH including uplink control information, and a time domain length between a time domain location of a CSI-RS corresponding to the uplink control information and the time domain location of the PUSCH is greater than or equal to a second time domain length.

The uplink control information may include a P-CSI report and/or an SP-CSI report.

Step 1602: The terminal device transmits the uplink control information to a network device through the PUSCH. In other words, the network device receives the uplink control information transmitted by the terminal device through the PUSCH.

Similar to the embodiment shown in FIG. 2, when the terminal device transmits the uplink control information to the network device through the PUSCH, the terminal device no longer sends information on the PUCCH.

Figure 17:
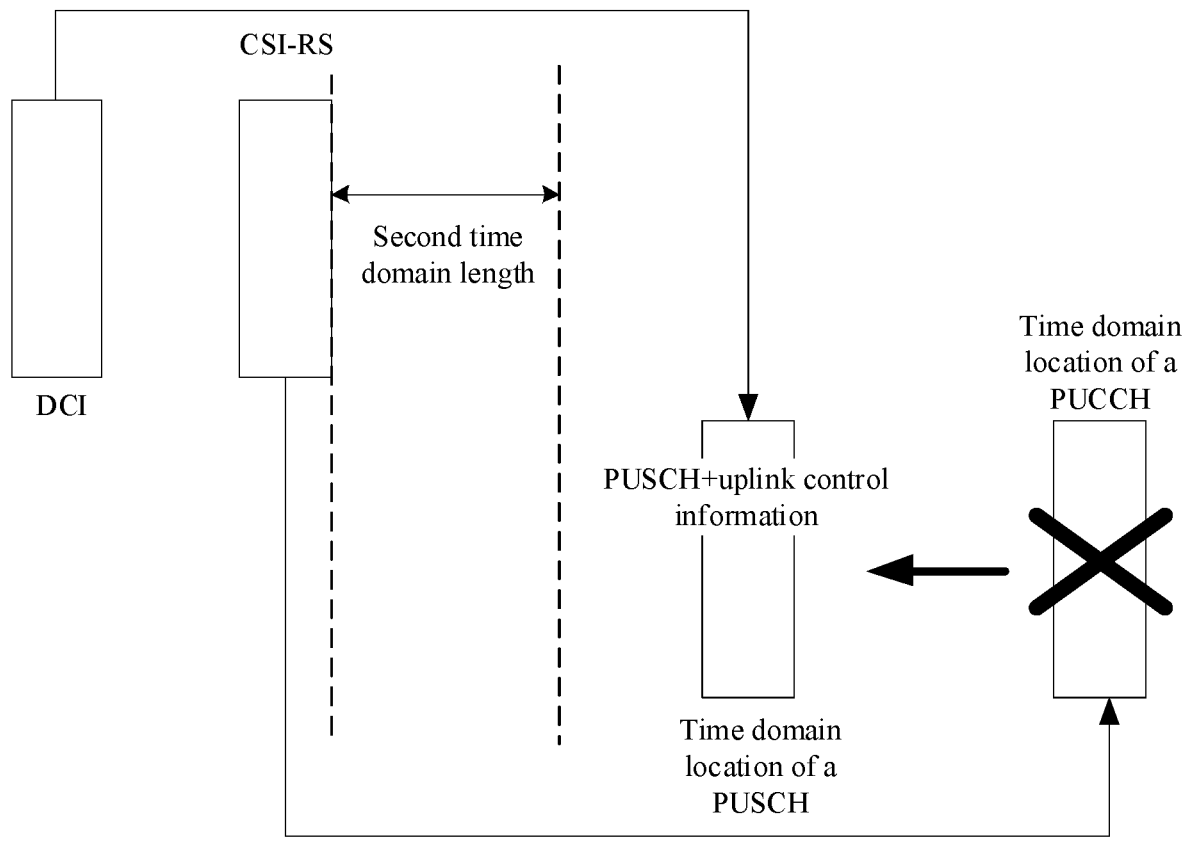
FIG. 17 is a schematic diagram of another type of transmission of uplink control information according to this application.

In this embodiment, it can be ensured based on a limitation of the second time domain length that the terminal device has enough time to decode the PDSCH and generate a P-CSI report and/or an SP-CSI report. For example, a schematic diagram of transmission of the uplink control information for which the second time domain length is limited may be shown in FIG. 17.

In a specific implementation, the second time domain length may be represented by $T_{proc,CSI}$, where $T_{proc,CSI}$ may satisfy the following Formula 2:

$$T_{proc,CSI} = (Z)(2048+144) \cdot \kappa 2^{-\mu} \cdot T_c \qquad \text{Formula 2}$$

Herein, Z is a predefined value. For κ and $T_c$, refer to the related description in Formula 1 in the embodiment shown in FIG. 14. Details are not described herein again.

Specifically, a method in which the terminal device transmits the uplink control information to the network device through the PUSCH is similar to the method in which the terminal device transmits the uplink control information to the network device through the PUSCH in the embodiment shown in FIG. 2. For details, refer to the related description in the foregoing methods a1 to a3, b1 to b3, and c1 to c4. Details are not described herein again.

Optionally, in this embodiment, because the time domain location of the PUSCH is before the time domain location of the PUCCH including the uplink control information, when the terminal device transmits the uplink control information to the network device through the PUSCH, limitations in the foregoing methods b1 and b2 may not be used. In other words, in this embodiment, a bit concatenation (namely, the foregoing method a1) manner or a puncturing (namely, the foregoing method a2) manner may be used. This is not limited by the time domain length between the time domain location of the PUCCH and the time domain location of the PUSCH (in other words, a value relationship between the sixth time domain length or the seventh time domain length and the time domain length between the time domain location of the PUCCH and the time domain location of the PUSCH does not need to be considered).

Specifically, for a specific manner in which the network device configures, for the terminal device, capability information for transmitting the uplink control information through the PUSCH, also refer to the related description in the manners d1 to d4 in the embodiment shown in FIG. 2. Details are not described herein again.

According to the uplink control information transmission method provided in this application, the uplink control information is transmitted through the PUSCH, so that a quantity of uplink transmission times can be reduced, thereby reducing power consumption of the terminal device.

Figure 18:
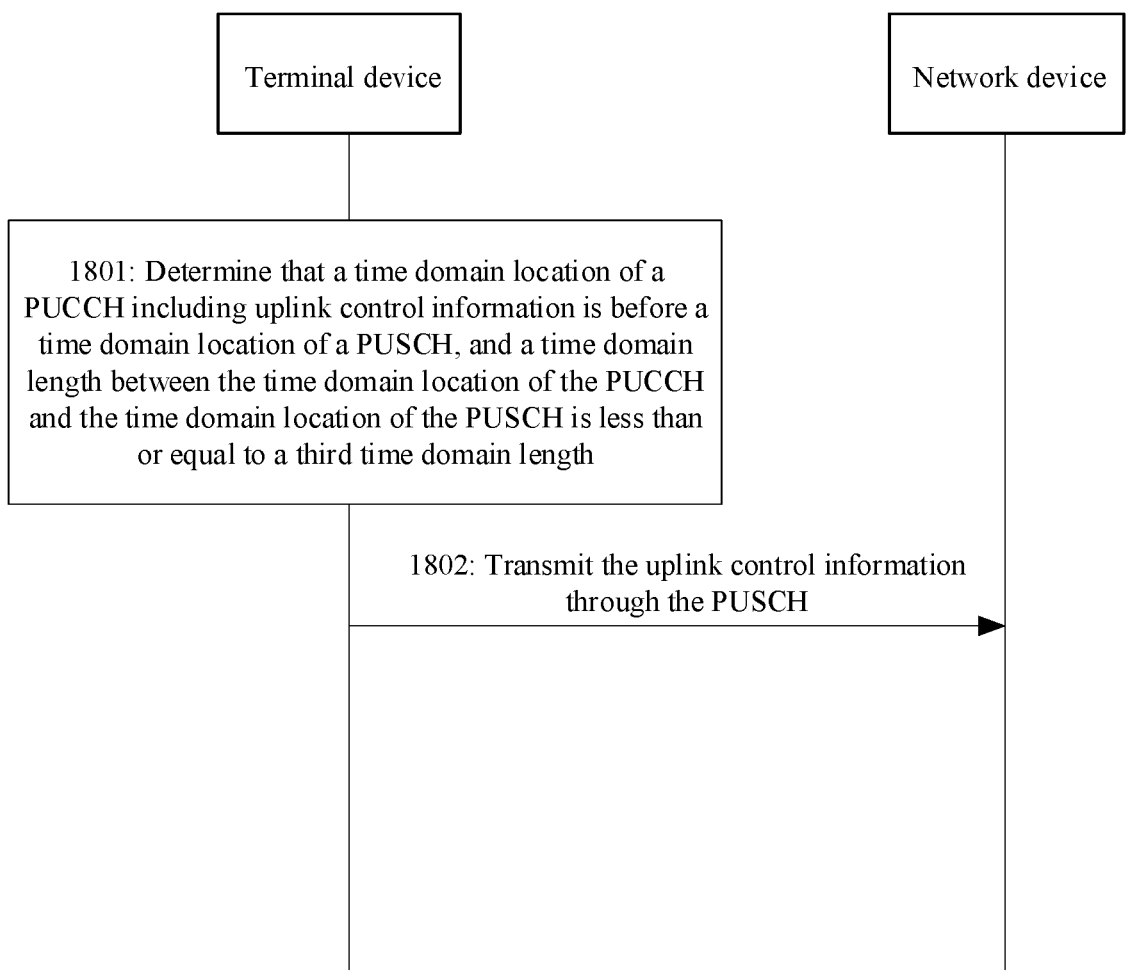
FIG. 18 is a flowchart of another uplink control information transmission method according to this application.

Based on the foregoing description, an embodiment of this application further provides another uplink control information transmission method. The method is applicable to the communication system shown in FIG. 1. As shown in FIG. 18, a specific procedure of the method may include the following steps.

Step 1801: A terminal device determines that a time domain location of a PUCCH including uplink control information is before a time domain location of a PUSCH, and a time domain length between the time domain location of the PUCCH and the time domain location of the PUSCH is less than or equal to a third time domain length.

Step 1802: The terminal device transmits the uplink control information to a network device through the PUSCH. In other words, the network device receives the uplink control information transmitted by the terminal device through the PUSCH.

This embodiment is applicable to a configured grant (CG)-PUSCH transmission scenario (for specific description, refer to the related description of the transmission manner of the CG in the foregoing description of uplink transmission of NR, and details are not described herein again). In this scenario, there may be no DCI.

Similar to the embodiment shown in FIG. 2, when the terminal device transmits the uplink control information to the network device through the PUSCH, the terminal device no longer sends information on the PUCCH.

Figure 19:
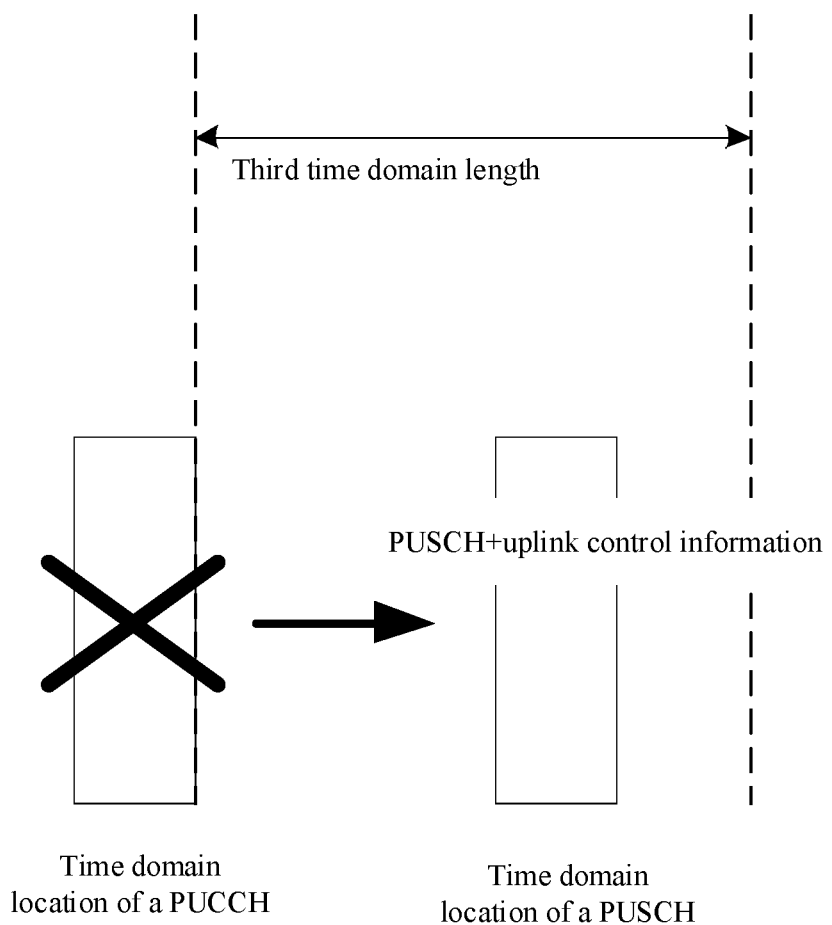
FIG. 19 is a schematic diagram of another type of transmission of uplink control information according to this application.

For example, a schematic diagram of transmission of the uplink control information for which the third time domain length is limited may be shown in FIG. 19.

Optionally, the third time domain length may be one or more symbols, or one or more slots.

The third time domain length may be predefined in a standard, or may be configured by the network device for the terminal device, or may be determined by the terminal device and then reported to the network device.

Specifically, a method in which the terminal device transmits the uplink control information to the network device through the PUSCH is similar to the method in which the terminal device transmits the uplink control information to the network device through the PUSCH in the embodiment shown in FIG. 2. For details, refer to the related description in the foregoing methods a1 to a3, b1 to b3, and c1 to c4. Details are not described herein again.

Specifically, for a specific manner in which the network device configures, for the terminal device, capability information for transmitting the uplink control information through the PUSCH, also refer to the related description in the manners d1 to d4 in the embodiment shown in FIG. 2. Details are not described herein again.

According to the uplink control information transmission method provided in this application, the uplink control information is transmitted through the PUSCH, so that a quantity of uplink transmission times can be reduced, thereby reducing power consumption of the terminal device.

It should be noted that, when a relationship between the PUCCH including the uplink control information and a plurality of PUSCHs meets both the case in the embodiment shown in FIG. 2 or FIG. 18 and the case in the embodiment shown in FIG. 14 or FIG. 16, the terminal device may select one PUSCH from the plurality of PUSCHs to transmit the current uplink control information.

It should be noted that " . . . greater than or equal to . . . " and " . . . less than . . . " in the foregoing embodiments are merely examples. It should be understood that "greater than" is a case, and "less than" is another case. "Equal to" may be classified into the foregoing case of "greater than", or certainly may be classified into the case of "less than". This is not limited in this application.

It should be noted that a time domain location of XX in the foregoing embodiments may be alternatively referred to as an XX occasion. For example, the time domain location of the PUCCH may be referred to as a PUCCH occasion.

With reference to an actual scenario, the following describes that, by using the method in the foregoing embodiments, a quantity of uplink transmission times can be reduced, thereby reducing power consumption of the terminal device. Specifically, when the terminal device is a mobile phone, in a scenario in which a user of a mobile phone receives and sends a WeChat message by using the mobile phone, when receiving the WeChat message by using the mobile phone, the user receives a downlink data packet (included in a PDSCH), and sends HARQ feedback to the network device. When sending a WeChat message by using the mobile phone, the user sends an uplink data packet (included in a PUSCH). According to a current method, if the mobile phone determines, based on a configuration/an indication of the network device, that a time domain location for sending the HARQ feedback does not overlap a time domain location for sending the PUSCH, the mobile phone sends the HARQ feedback and the PUSCH respectively at the two time domain locations, namely, sends two uplink signals. If the solution in the present disclosure is used, when a condition is met, the mobile phone may combine the HARQ feedback onto the PUSCH for sending, and the mobile phone sends only one uplink signal. In this way, energy saving effect of the mobile phone is achieved.

Based on the foregoing embodiments, the uplink control information transmission method is described in detail by using some specific examples. In the following examples, an example in which the terminal device is UE, the network device is a base station, and the uplink control information is UCI is used for description.

In the following examples, this solution is used to reduce a quantity of uplink transmission times of the UE, to reduce power consumption of uplink transmission of the UE.

Specifically, in the following examples, to reduce the quantity of uplink transmission times of the UE, the UE may "predict" that when there is a PUSCH near the PUCCH of UCI (HARQ-ACK or P-CSI/SP-CSI), the UCI is carried on the PUSCH for transmission. Further, this solution may be described from the following four aspects: First, how to use the feature, to be specific, how to use the feature of adding the UCI to the PUSCH for transmission. Second, how to define "near the PUCCH". Third, how to combine the UCI onto the PUSCH for sending. Fourth, how to avoid impact on transmission performance.

According to the first aspect, how to use the feature, to be specific, how to use the feature of adding the UCI to the PUSCH for transmission:

Method 1: A condition for joint transmission is defined in a standard. When the PUCCH and the PUSCH meet the condition, both the base station and the UE can determine that joint transmission can be performed on the two (namely, the UCI and information on the PUSCH).

Method 2: The base station dynamically indicates, in DCI for scheduling the PUSCH, whether combination can be performed, and a combination range and a combination condition may be the same as those in the method 1. Method 2 may be understood as a dynamic switch to "enable the feature".

According to the second aspect, how to define "near the PUCCH":

Scenario 1: When the PUSCH is a PUSCH dynamically scheduled by using the DCI, and the PUCCH is located between the DCI and the PUSCH, it may be considered that the PUSCH is near the PUCCH.

Specifically, a distance between the DCI and the PUCCH needs to be greater than or equal to a gap 1 (namely, the foregoing fourth time domain length), so that the UE has enough time to perform DCI blind detection. If the DCI is detected, it is determined that the UCI is combined onto the PUSCH for sending. If the DCI is not detected, it is determined that the UCI is sent on the PUCCH.

A distance between the PUCCH and the PUSCH (namely, a distance between the time domain locations) needs to be less than or equal to a gap 2 (namely, the fifth time domain length in the foregoing embodiment), to avoid an excessively large latency caused by delayed sending of the UCI.

Scenario 2: When the PUSCH is a semi-persistent PUSCH, the distance between the PUCCH and the PUSCH is less than or equal to a gap 3 (namely, the third time domain length in the foregoing embodiment).

According to the third aspect, how to combine the UCI onto the PUSCH for sending:

Method 1: The UCI may be multiplexed onto the PUSCH. To be specific, information bits of the UCI and bits of uplink data are subjected to bit concatenation, and then modulated and mapped together to physical resources of the PUSCH.

Method 2: The UCI may puncture the PUSCH.

Only the method 1 may be used; or only the method 2 may be used; or whether to use the method 1 or the method 2 is configured by the base station; or whether to use the method 1 or the method 2 is determined based on a condition.

For example, when the distance between the PUCCH and the PUSCH is greater than or equal to a gap 4 (namely, the sixth time domain length in the foregoing embodiment), the multiplexing manner is used; or otherwise, the puncturing manner is used.

For another example, when the distance between the PUCCH and the PUSCH is greater than or equal to a gap 5 (namely, the seventh time domain length in the foregoing embodiment), the multiplexing manner is used; or otherwise, a legacy transmission manner is used, and combination is not performed.

For another example, a UCI information bit quantity threshold N is introduced. When a quantity of UCI information bits on which combination needs to be performed is greater than or equal to N, the multiplexing manner is used; or otherwise, the puncturing manner is used.

In a scenario, if the PUCCH carries the P-CSI report/SP-CSI report, and the PUSCH carries the AP-CSI report, the P-CSI report/SP-CSI report is dropped.

Optionally, only when the report content (reportQuantity) of the CSI report sent on the PUCCH is fully or partially the same as the report content (reportQuantity) of the CSI report sent on the PUSCH, the PUCCH is dropped; or otherwise, the CSI report on the PUCCH is combined onto the PUSCH for sending.

According to the fourth aspect, how to avoid impact on transmission performance:

Possible impact 1: After the UCI is combined onto the PUSCH for transmission, energy per bit decreases, and coverage performance is affected.

Solution 1: An RSRP threshold is introduced. When an RSRP reported by the UE to the base station is greater than the RSRP threshold, it is considered that coverage of the UE is not limited. In this case, the joint transmission manner in this application can be used. Otherwise, a currently commonly used manner is used.

Solution 2: Power control for the PUSCH is enhanced.

For example, when the UCI is combined onto the PUSCH for sending, a transmit power of the PUSCH is increased by X dB. A value of X may be predefined, or configured by the base station, or indicated by the DCI.

For another example, when the UCI is combined onto the PUSCH for sending, a final transmit power of the PUSCH may be determined based on an original PUCCH transmit power and an original PUSCH transmit power. For example, the powers are added, or the powers are added and then multiplied by a coefficient.

Possible impact 2: If the quantity of UCI information bits is large, UCI transmission may fail when the UCI is combined onto the PUSCH for transmission.

Solution: A UCI information bit quantity threshold M is introduced. Combination is performed only when a quantity of UCI information bits on which combination needs to be performed is less than or equal to M. Otherwise, a currently commonly used manner is used for transmission.

Figure 20:
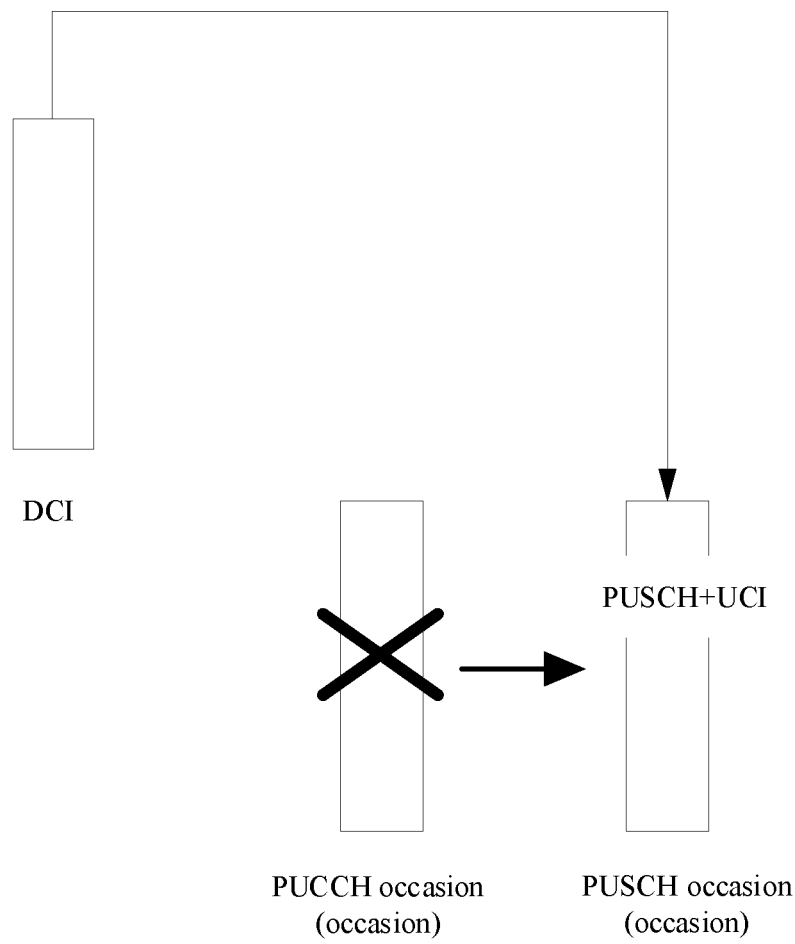
FIG. 20 is a schematic diagram of a type of transmission of UCI according to this application.

In a first specific example, when a PUCCH carrying UCI (including a HARQ-ACK and/or a P-CSI/SP-CSI) is located between DCI and a PUSCH, the UE combines the UCI onto the subsequent PUSCH for sending (namely, the terminal device transmits the uplink control information through the PUSCH in the foregoing embodiment). An example may be shown in FIG. 20. A leftmost part is the DCI, a rightmost part is the PUSCH scheduled by using the DCI, and a middle part is the PUCCH carrying the UCI. In the solution of this example, the PUCCH in the middle is not sent, and the UCI is combined onto the PUSCH on the right for sending.

Specifically, to reduce power consumption of uplink sending, the UCI is combined onto the PUSCH for sending in this solution. Because the PUSCH is dynamically scheduled by using the DCI, to ensure that the UCI can be combined onto the PUSCH, the UE needs to determine that a PUSCH is transmitted near the PUCCH. If the DCI is located after the PUCCH, the UE cannot predict that the PUSCH is transmitted near the PUCCH. To ensure that the UCI can be sent to the base station, only the PUCCH can be selected to carry the UCI. Therefore, the DCI needs to be located before the PUCCH.

Figure 21:
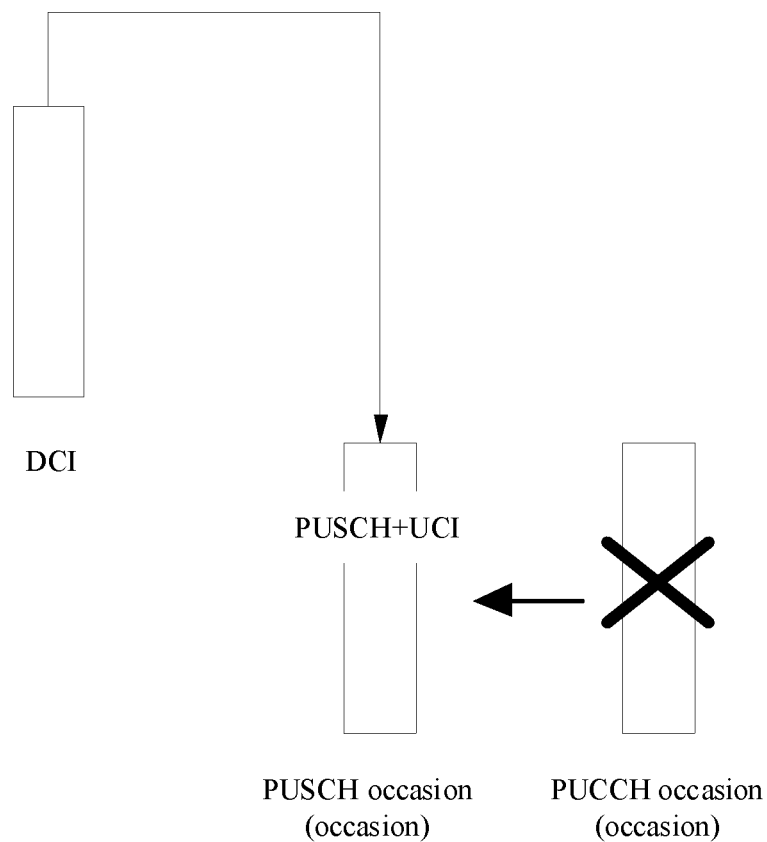
FIG. 21 is a schematic diagram of another type of transmission of UCI according to this application.

In addition, if both the DCI and the PUSCH scheduled by using the DCI are before the PUCCH, it means that transmission time (namely, a time domain location) of the UCI needs to be advanced from the PUCCH to a location of the PUSCH (as shown in FIG. 21). It takes a specific period of time for the UE to generate the UCI. For example, when generating a HARQ-ACK, the UE needs to decode and check downlink data, to determine whether the data is correctly transmitted and determine whether to generate an ACK or a NACK. When generating a CSI report, the UE needs to receive a CSI-RS, process the received signal, and generate a report. Therefore, if the UCI is transmitted in advance, it may not be ensured that the UE has enough processing time to generate the UCI. Therefore, preferably, the PUSCH needs to be located after the PUCCH.

By using the first specific example, the UCI may be combined onto the PUSCH, so that a quantity of uplink transmission times is reduced, thereby reducing power consumption of the UE.

In a second specific example, for example, an explanation of "Why the PUSCH needs to be after the PUCCH" is provided in the first specific example. However, when the UCI is combined onto the PUSCH after the PUCCH, transmission time of the UCI is delayed. In other words, a communication latency is increased. In this example, some restrictions are added, to ensure that the PUSCH can be located before the PUCCH, thereby shortening the communication latency.

Figure 22:
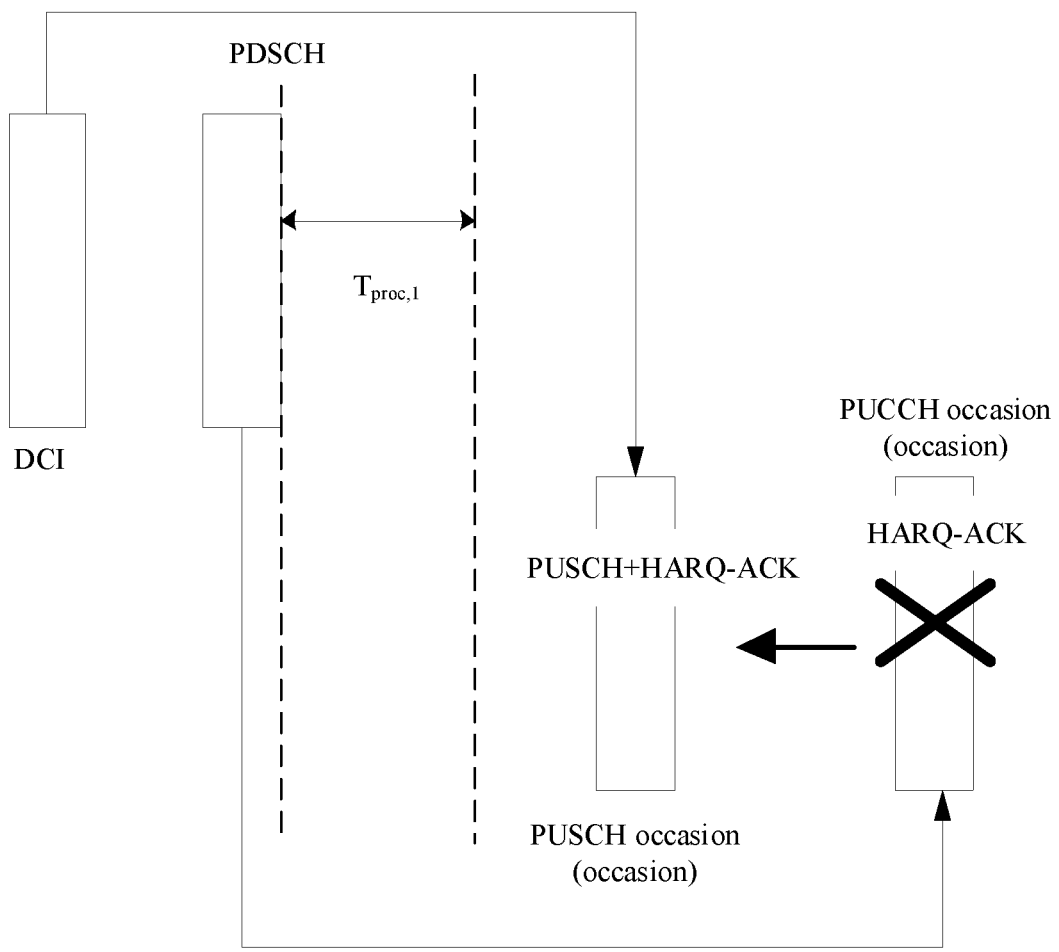
FIG. 22 is a schematic diagram of another type of transmission of UCI according to this application.

When the UCI is a HARQ-ACK, if a gap that is between the PDSCH and the PUSCH and that corresponds to the HARQ-ACK is greater than or equal to a predefined gap (namely, the first time domain length in the foregoing embodiment), it is considered that the UCI can be combined onto the PUSCH for sending. As shown in FIG. 22, the gap may be $T_{proc,1}$. Specifically, for a related explanation of $T_{proc,1}$, refer to Formula 1 and the related description of the parameters in Formula 1 in the embodiment shown in FIG. 14. Details are not described herein again.

Figure 23:
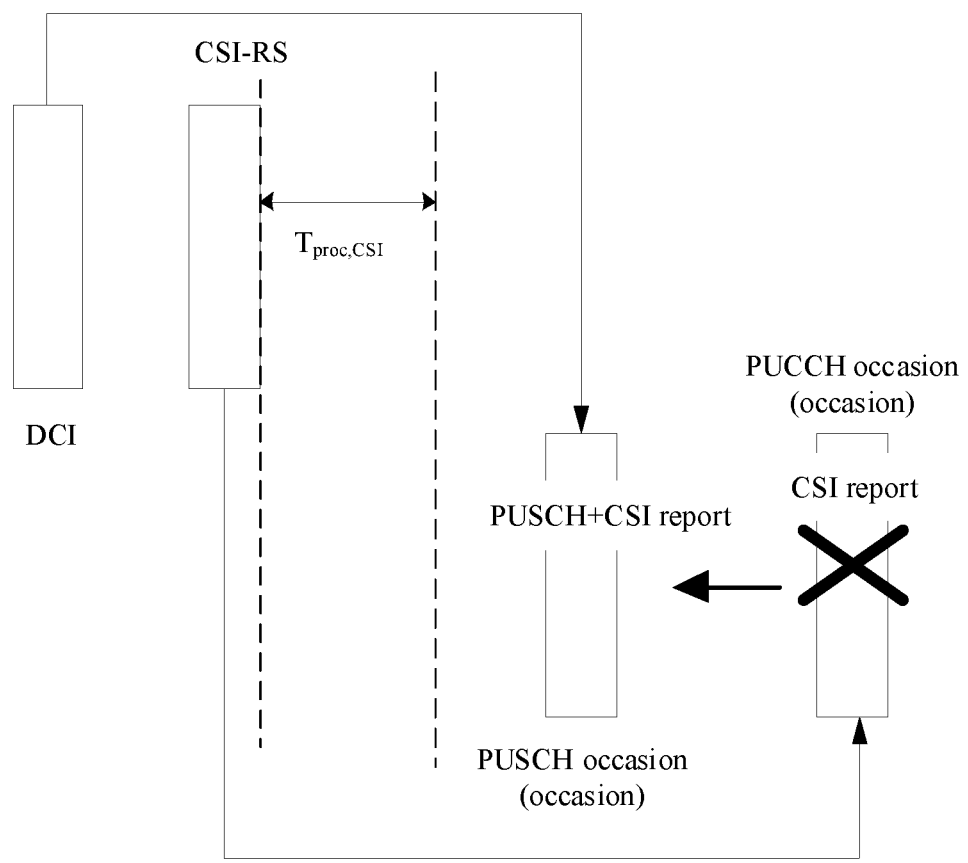
FIG. 23 is a schematic diagram of another type of transmission of UCI according to this application.

Similarly, when the UCI is a CSI report, if a gap that is between the PDSCH and the PUSCH and that corresponds to the CSI report is greater than or equal to a predefined gap (namely, the second time domain length in the foregoing embodiment), it is considered that the UCI can be combined onto the PUSCH for sending. As shown in FIG. 23, the gap may be $T_{proc,CSI}$. For $T_{proc,CSI}$, refer to the related description of Formula 2 in the embodiment shown in FIG. 16. Details are not described herein again.

Similarly, similar to the first specific embodiment, the function (namely, the UCI is combined onto the PUSCH for sending) may be used after the base station configures the function for the UE, or whether the function is used is dynamically indicated after the base station configures the function.

Based on the second specific example, combination may be performed for uplink transmission, and the UCI is allowed to be transmitted in advance, thereby reducing power consumption of the UE and reducing a transmission latency. Compared with the first specific example, the transmission latency can be reduced.

In a third specific example, this example is a further supplement to the first specific example or the second specific example, and more clearly describes "there is a PUSCH near the PUCCH".

Figure 24:
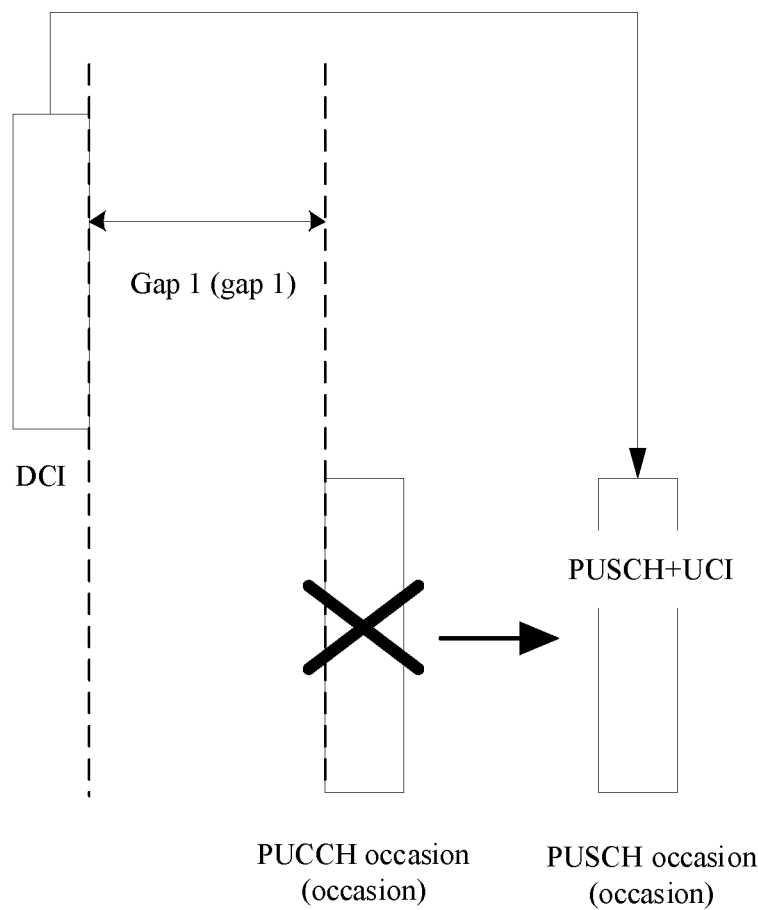
FIG. 24 is a schematic diagram of another type of transmission of UCI according to this application.

A gap between the PUCCH and the DCI (namely, the time domain length between the time domain location of the PUCCH and the time domain location of the DCI) needs to be considered. In this case, a rule may be described as follows: When the PUCCH carrying the UCI (including the HARQ-ACK and/or the P-CSI report/SP-CSI report) is located between the DCI and the PUSCH, and a length between an end symbol of the DCI (namely, an end location of a time domain location) and a start symbol of the PUCCH (namely, a start location of a time domain location, which is the same as that described below) is greater than or equal to a gap 1 (namely, the fourth time domain length described above, which is the same as that described below), the UCI is combined onto the following PUSCH for sending. An example is shown in FIG. 24.

A purpose of the gap 1 is to ensure that the UE can have enough time to complete DCI decoding, so that the UE learns whether PUSCH scheduling is performed subsequently. If the DCI is excessively close to the PUCCH, the UE may not complete DCI decoding, and cannot learn whether a PUSCH is transmitted near the PUCCH. To ensure that the UCI can be sent to the base station, only the PUCCH can be selected to carry the UCI.

In a typical case, the gap 1 may be one or more symbols or one or more slots. A value of the gap 1 may be predefined in a standard, or may be configured by the base station for the UE, or may be reported by the UE.

When the base station configures or indicates a minimum scheduling offset for the UE, a value of the gap 1 may be equal to currently effective K0min (a minimum value of K0).

Figure 25:
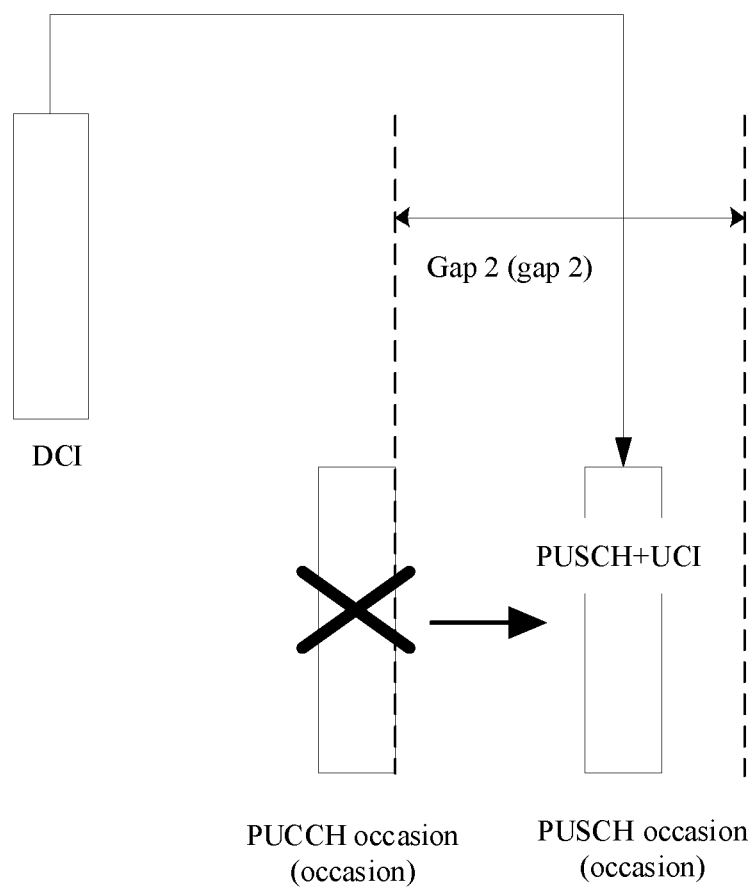
FIG. 25 is a schematic diagram of another type of transmission of UCI according to this application.

In addition, a gap between the PUCCH and the PUSCH also needs to be considered. In this case, a rule may be described as follows: When the PUCCH carrying the UCI (including the HARQ-ACK and/or the P-CSI report/SP-CSI report) is located between the DCI and the PUSCH, and a length between an end symbol of the PUCCH and a start symbol of the PUSCH is less than or equal to a gap 2 (namely, the fifth time domain length in the foregoing embodiment), the UCI is combined onto the following PUSCH for sending. An example is shown in FIG. 25.

A purpose of the gap 2 is to avoid an excessively large latency. When the UCI is combined onto the subsequent PUSCH for sending, sending time of the UCI is delayed. As a result, an entire communication latency is increased. To avoid impact of the solution of the present disclosure on the communication latency, "a range in which sending of the UCI can be delayed" may be limited. To be specific, the gap 2 is introduced.

Figure 26:
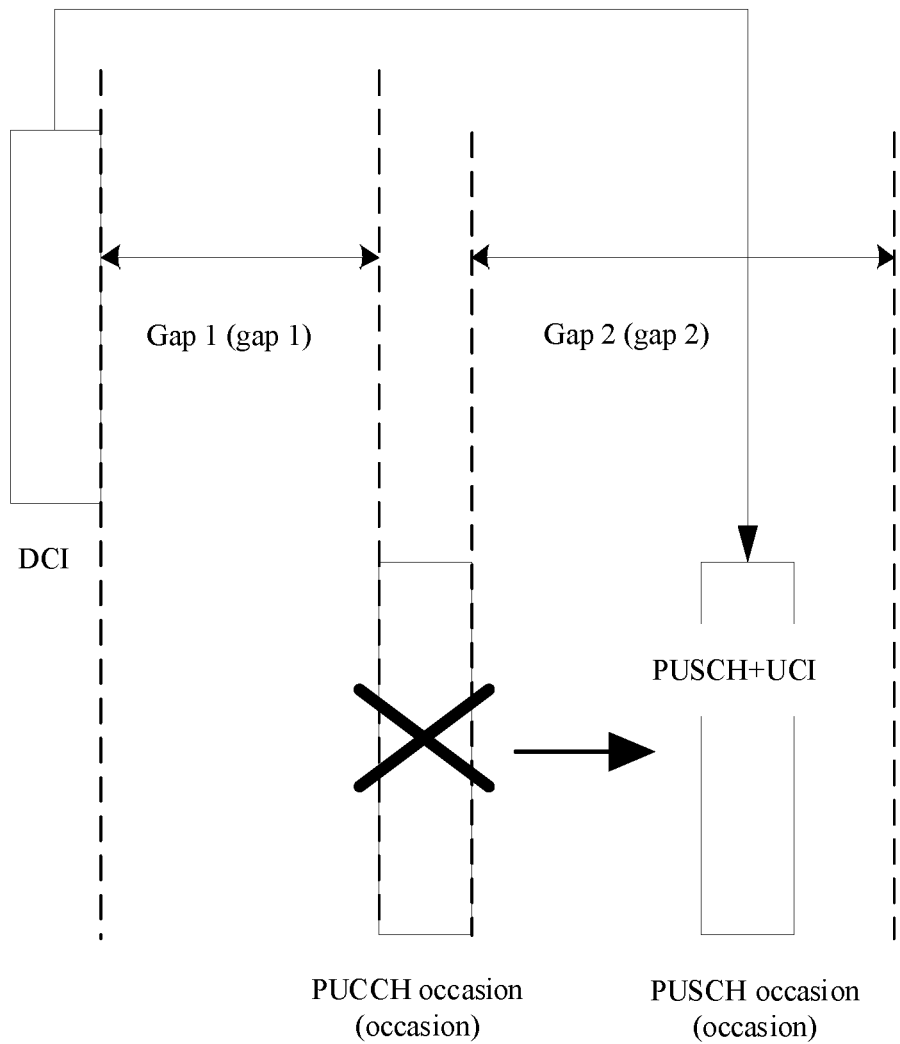
FIG. 26 is a schematic diagram of another type of transmission of UCI according to this application.

Certainly, the gap 1 and the gap 2 may also be used together, as shown in FIG. 26.

It should be noted that the gap 1 may be used in combination with the first specific example and the second specific example, but the gap 2 can be used only in combination with the first specific example and cannot be used in combination with the second specific example, because the UCI is sent in advance in the second specific example.

Based on the third specific example, it can be ensured by using the gap 1 that the UE can "predict" whether a PUSCH is transmitted near the PUCCH, to combine the UCI onto the PUSCH for sending; and it can be ensured by using the gap 2 that the transmission latency is not excessively large. Compared with the first specific example, a location relationship between the DCI and the PUCCH is further specified based on the gap 1, thereby ensuring feasibility of the solution. Excessively large impact of the solution on the latency is avoided based on the gap 2.

In a fourth specific example, the solution of this application is further improved. In the first to the third specific examples, only a PUSCH dynamically scheduled by using DCI is considered, and a CG-PUSCH is not considered. When a CG-PUSCH is considered, because there may be no DCI, the "condition" (namely, the defined relationship between the time domain locations of the DCI, the PUCCH, or the PUSCH, or the like) defined in the first to the third specific examples is no longer applicable.

For the CG-PUSCH, a condition for joint transmission may be defined as follows: When the PUCCH carrying the UCI (including the HARQ-ACK and/or the P-CSI report/SP-CSI report) is located before the PUSCH, and a length between an end symbol of the PUCCH and a start symbol of the PUSCH is less than or equal to a gap 3 (namely, the third time domain length in the foregoing embodiment), the UCI is combined onto the following PUSCH for sending.

Alternatively, in a manner, the UCI cannot be combined onto the CG-PUSCH for transmission in a case of the CG-PUSCH.

In the fourth specific example, the case of the CG-PUSCH is supplemented, and the solution is improved.

In a fifth specific example, the solutions in the first to the fourth specific examples are further improved. In this example, a specific solution of how to combine the UCI onto the PUSCH for sending is described in detail.

Specifically, the UCI may be combined onto the PUSCH for sending (namely, the UCI is transmitted through the PUSCH) in the following two manners:

Combination method 1: The UCI may be multiplexed onto the PUSCH. To be specific, information bits of the UCI and bits of uplink data are concatenated by the UE, and then modulated and mapped together to physical resources of the PUSCH.

Combination method 2: The PUSCH may be punctured for the UCI. To be specific, the UE separately modulates the UCI, and after the PUSCH is generated, replaces modulated symbols of some REs occupied by the PUSCH with symbols obtained after the UCI is modulated.

In the solutions of the first to the fourth specific examples, the method 1 or the method 2 may be combined. Alternatively, the base station sends configuration information to the UE to determine whether the method 1 or the method 2 is used.

Figure 27:
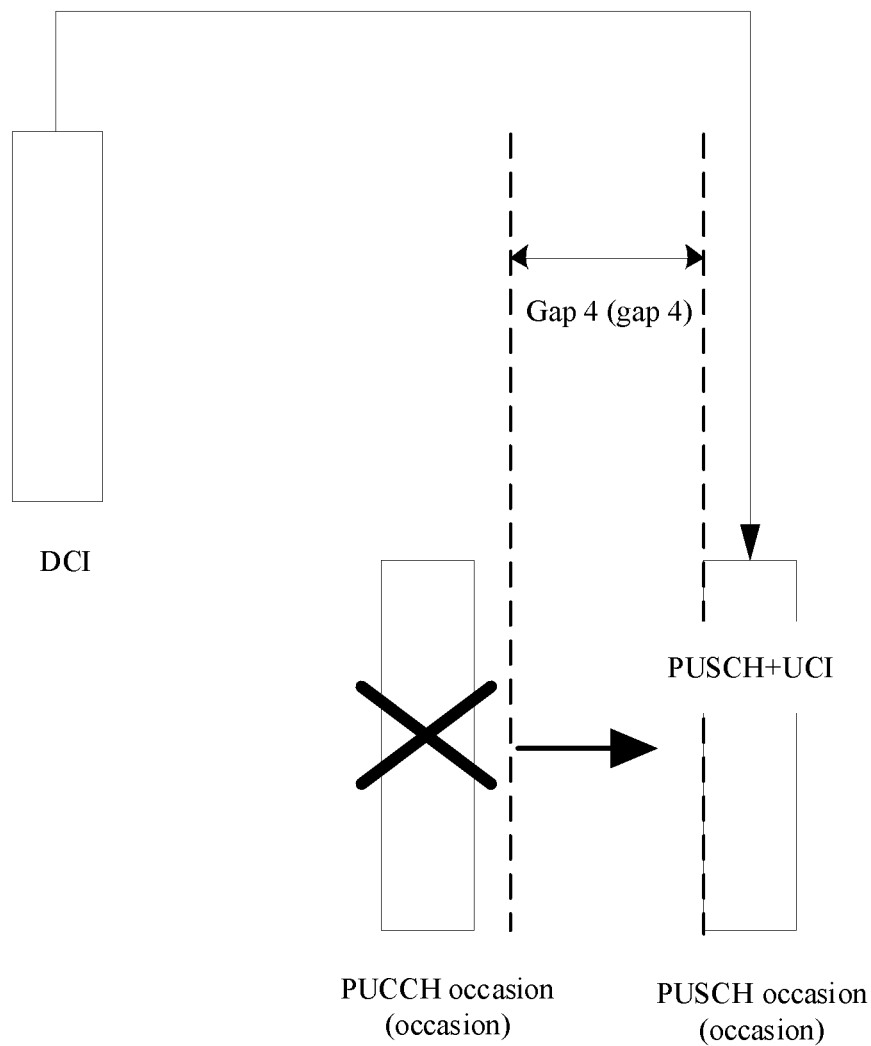
FIG. 27 is a schematic diagram of another type of transmission of UCI according to this application.

In another case, how to combine the UCI onto the PUSCH for sending may be determined in a condition determining manner:

Manner 1: A gap 4 (namely, the sixth time domain length in the foregoing embodiment) is introduced. For example, as shown in FIG. 27. When a distance between the PUCCH and the PUSCH is greater than or equal to the gap 4, a multiplexing manner is used; or otherwise, a puncturing manner is used. A principle is as follows: If the multiplexing manner is used for combination, joint modulation needs to be performed on the UCI and the uplink data. Therefore, enough time needs to be reserved for the UE. However, when the puncturing manner is used, the UCI and the uplink data are separately modulated. Even if the PUCCH is close to the PUSCH, generation of a signal of the PUSCH is not affected by processing of the UCI, and only some REs need to be replaced when the PUSCH is sent. Therefore, the puncturing manner takes less time.

Manner 2: A gap 5 (namely, the seventh time domain length in the foregoing embodiment) is introduced. When a distance between the PUCCH and the PUSCH is greater than or equal to the gap 5, a multiplexing manner is used; or otherwise, a legacy transmission manner is used, and combination is not performed. In this manner, it is equivalent to that there is only one combination manner: multiplexing. The condition may be used to determine whether to perform combination.

Manner 3: A UCI information bit quantity threshold N (namely, the first value in the foregoing embodiment) is introduced. When a quantity of UCI information bits on which combination needs to be performed is greater than or equal to N, a multiplexing manner is used; or otherwise, a puncturing manner is used. A principle is as follows: When the puncturing manner is used, some REs in the PUSCH are directly replaced with the modulated symbols obtained after the UCI is modulated. This is equivalent to a case in which a part of information of the uplink data is damaged. After channel encoding is performed on the uplink data, a part of redundant information is introduced. The addition of the redundant information may enable that even if a part of the PUSCH after coding and modulation is damaged, all original information can still be restored when the damaged part accounts for a relatively small proportion. Therefore, when the quantity of information bits of the UCI is relatively small, even if the UCI is sent together with the uplink data in the puncturing manner, both the UCI and the uplink data can be correctly transmitted. However, when the quantity of information bits of the UCI is relatively large, transmission of the uplink data may fail when the puncturing manner is used. Therefore, the information bit quantity threshold is introduced. The puncturing manner is used when a condition is met, thereby reducing a transmission failure probability. It should be noted that the manner 3 may be used in combination with the manner 1. In other words, whether the multiplexing manner or the puncturing manner is used is determined based on the two conditions in the manner 1 and the manner 3.

In the foregoing description, the PUSCH may be a PUSCH carrying uplink data. Next, the following question is considered: If the UCI is a P-CSI report/an SP-CSI report and sending of an AP-CSI report is also scheduled on the PUSCH, what can the UE do?

In some current embodiments, when the PUCCH carrying the P-CSI report/SP-CSI report and the PUSCH carrying the AP-CSI report do not overlap, the PUCCH and the PUSCH do not affect sending of each other. However, because the P-CSI report/SP-CSI report and the AP-CSI report are both CSI reports, functions may overlap to some extent. Sending a CSI report twice may not significantly improve performance, but may cause power consumption of the UE. Therefore, in this example, the following solution may be considered: When the PUCCH carrying the P-CSI report/SP-CSI report is located between the DCI and the PUSCH, and the DCI triggers the AP-CSI report, the PUCCH is dropped (drop, namely, is not sent). A schematic diagram may be shown in FIG. 8.

Further, when configuring related configuration information of the CSI report for the UE, the base station configures a parameter referred to as reportQuantity. The parameter is used to indicate a type of channel state information carried in the current CSI report. In an existing standard, for possible values of reportQuantity, refer to the possible values of reportQuantity in the embodiment shown in FIG. 2.

This example is used to avoid repeated transmission of CSI reports having a same function (to be specific, transmission is performed once through the PUCCH carrying the P-CSI report/SP-CSI report, and then transmission is performed once through the PUSCH carrying the AP-CSI report), and one time of transmission of the CSI report is canceled. To avoid impact on performance to greatest extent, "CSI reports having a same function" may be clearly defined as follows: ReportQuantity is fully or partially the same. In this case, the solution may be further specified as follows: Only when reportQuantity of a CSI report sent on the PUCCH is fully or partially the same as reportQuantity of a CSI report sent on the PUSCH, the PUCCH is dropped; or otherwise, the CSI report on the PUCCH is combined onto the PUSCH for sending.

In the fifth specific example, how to combine the UCI onto the PUSCH for sending is specified, and the solution is further supplemented.

In a sixth specific example, the foregoing specific example is further supplemented.

Figure 28:
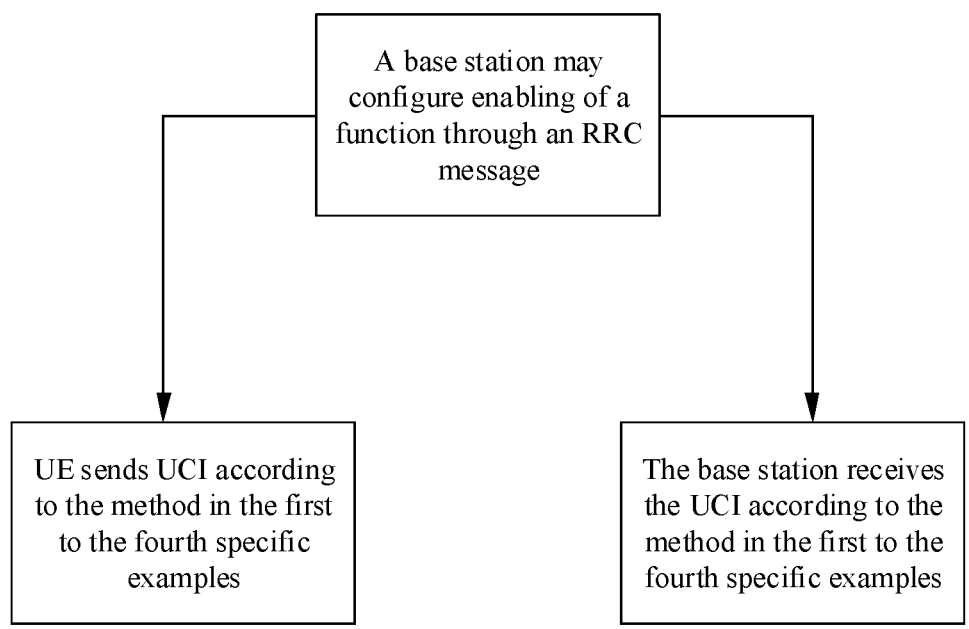
FIG. 28 is a schematic flowchart of a type of transmission of UCI according to this application.

Specifically, the base station may send configuration information (for example, by using RRC signaling (or a message) or a MAC CE) (namely, the first message in the foregoing embodiment) to the UE. The configuration information is used to enable the function (namely, the function of combining the UCI onto the PUSCH for sending, namely, the function of transmitting the UCI through the PUSCH in the foregoing embodiment). After the function is configured for the UE, when the relative time domain locations of the PUCCH and the PUSCH meet a condition, both the base station and the UE may determine that joint transmission can be performed on the two (namely, the UCI and information on the PUSCH). An example procedure may be shown in FIG. 28.

Figure 29:
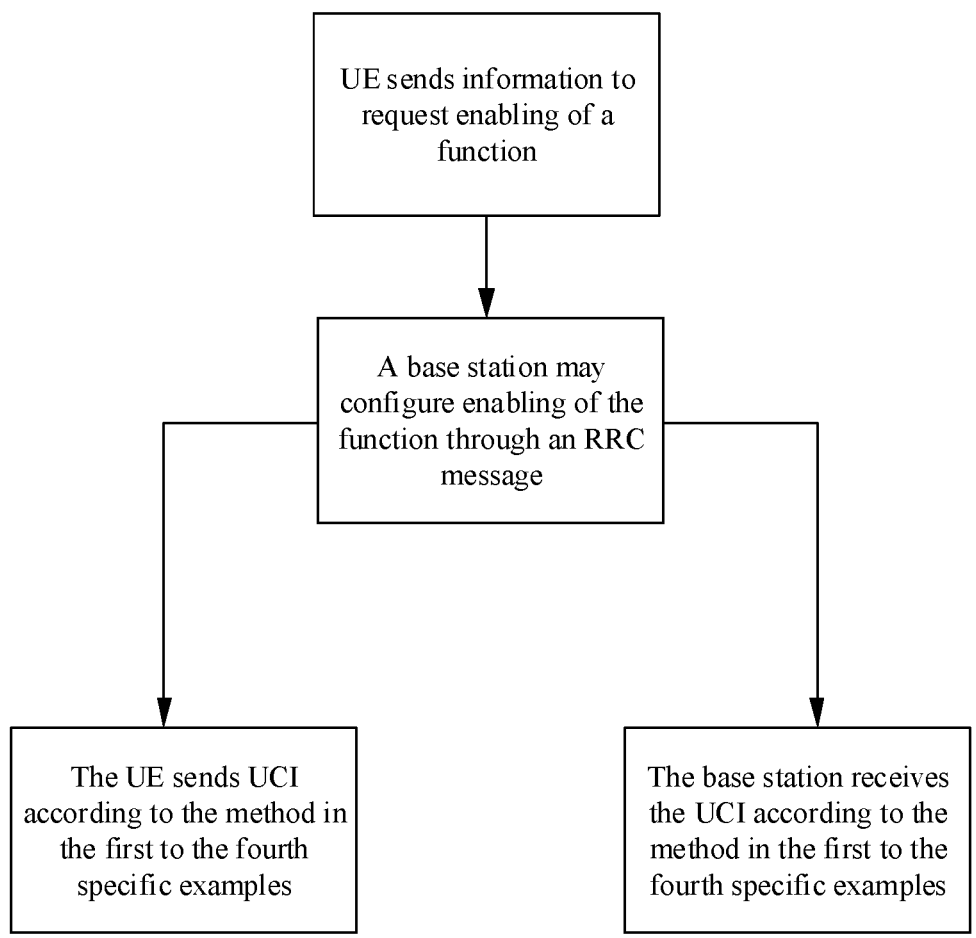
FIG. 29 is a schematic flowchart of another type of transmission of UCI according to this application.

In addition, the UE may send auxiliary information (namely, the second message in the foregoing embodiment) to request or trigger enabling or disabling of the function. An example procedure may be shown in FIG. 29.

Figure 30:
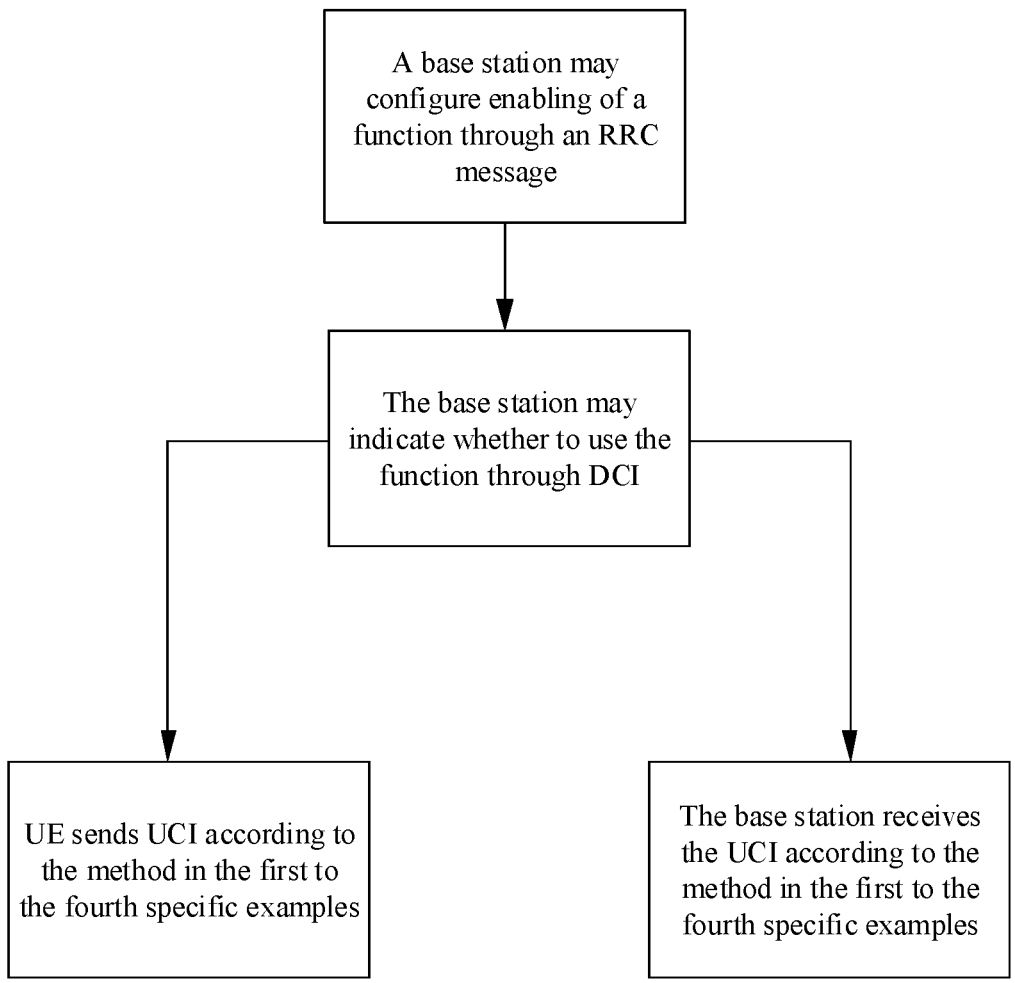
FIG. 30 is a schematic flowchart of another type of transmission of UCI according to this application.

In another case, after sending the configuration information to the UE, the base station further needs to send dynamic indication information (for example, the DCI) (namely, the third message in the foregoing embodiment) to the UE, to indicate whether the UE can perform joint transmission (in other words, whether to enable or use the function). For example, indication information is added to the DCI for scheduling the PUSCH, to indicate whether UCI on another PUCCH can be combined onto the current PUSCH for transmission. An example procedure may be shown in FIG. 30.

Figure 31:
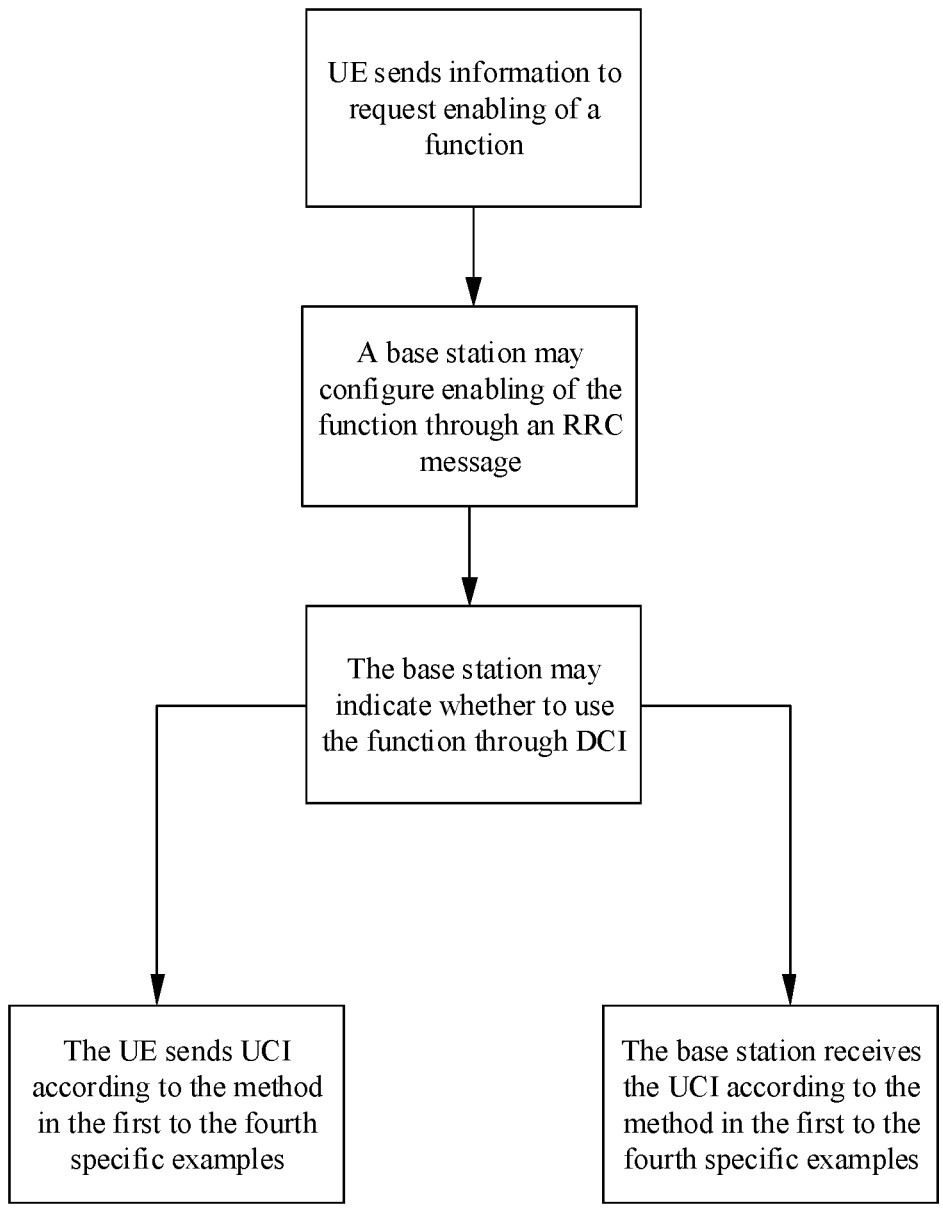
FIG. 31 is a schematic flowchart of another type of transmission of UCI according to this application.

Further, in the foregoing case, enabling or disabling of the function may be requested or triggered based on a request of the UE. An example procedure may be shown in FIG. 31.

In a seventh specific example, the example is used to avoid impact on transmission performance. When the UCI is separately transmitted through the PUCCH and the PUSCH, the UE needs to send a signal twice. Although transmission power consumption of the UE is relatively high, average allocated energy per bit in the two signals is also relatively high, so that high noise can be resisted, and a coverage area of the signal is relatively large. When the UCI is combined onto the PUSCH for sending, for the UCI or data or an AP-CSI report on the PUSCH, average allocated energy per information bit is relatively low. In this case, the coverage area of the signal may be limited, and signal transmission reliability is reduced. To resolve a problem of signal transmission reliability, the following several enhancement methods are provided in this example.

Method 1: An RSRP threshold is introduced. When an RSRP reported by the UE to the base station is greater than the RSRP threshold, it may be considered that coverage of the UE is not limited. In this case, the joint transmission manner in this application (namely, joint transmission of the UCI and the PUSCH) can be used. Otherwise, a currently commonly used manner is used. A principle is as follows: The UE calculates an RSRP value based on a power of a received reference signal sent by the base station. A greater RSRP value indicates a shorter distance between the UE and the base station. An RSRP threshold is equivalent to an equivalent distance threshold from the base station to the UE. When the RSRP received by the UE is greater than the RSRP threshold, it indicates that the UE is close enough to the base station. In this case, even if the UE combines the UCI onto the PUSCH for sending, it can still be ensured that a signal can be correctly transmitted. It should be noted that, in this method, the condition is "the RSRP reported by the UE to the base station". This is because transmission can be correctly performed only when both the UE and the base station learn whether the UCI is combined with the PUSCH. Therefore, both the UE and the base station need learn whether the RSRP condition is met.

Method 2: A power control manner of the PUSCH is enhanced. In some current embodiments, the transmit power of the PUSCH may be determined based on a path loss value estimated by the UE, a transmission parameter configured by the base station, and a TPC command indicated by the base station in the DCI. If no enhancement is performed, the UE determines the transmit power of the PUSCH according to the method in the current embodiments. If it is expected to improve transmission reliability of the UCI and the uplink data or the AP-CSI report, the transmit power of the PUSCH may be increased when joint transmission is performed on the UCI and the PUSCH, thereby increasing the average allocated energy per information bit. Specifically, the following several possible manners may be included:

Manner 1: When the UCI is combined onto the PUSCH for sending, a transmit power of the PUSCH is increased by X dB. A value of X may be predefined, or configured by the base station, or indicated by the base station by using the DCI.

Manner 2: When the UCI is combined onto the PUSCH for sending, a final transmit power of the PUSCH may be determined based on an initial PUCCH transmit power (namely, an original transmit power of the PUCCH) and an initial PUSCH transmit power (namely, an original transmit power of the PUSCH). For example, the two powers are added, or the two powers are added and then multiplied by a coefficient. For example, if the original transmit power of the PUCCH is 16 dBm, and the original transmit power of the PUSCH is 16 dBm, after the UCI is combined onto the PUSCH, the transmit power of the PUSCH may be a sum of the two powers, namely, 19 dBm; or the transmit power may be obtained by multiplying the sum of the two powers by a coefficient, namely, 18 dBm.

Method 3: A UCI information bit quantity threshold M (namely, the second value in the foregoing embodiment) is introduced. Combination is performed only when a quantity of UCI information bits on which combination needs to be performed is less than or equal to M. Otherwise, a currently commonly used manner is used. In this method, a decrease degree of the average allocated energy per information bit can be controlled, and combination is performed only when transmission can be ensured. Otherwise, combination is not performed.

In another case, transmission content may be alternatively determined based on a priority of the UCI. For example, when a quantity of UCI information bits on which combination needs to be performed is greater than M, the UE selects, in a descending order of priorities, K bits from the UCI on which combination needs to be performed, where K is less than or equal to M. Then, the UE combines the K bits onto the PUSCH for transmission. Remaining bits are not transmitted.

In the seventh specific example, feasibility of joint transmission of the UCI and the PUSCH is further considered, and impact of joint transmission on transmission performance is reduced to greatest extent.

In the foregoing embodiments, an uplink control information transmission method in a 5G communication system or a future communication system such as 6G is described. In another scenario, for example, in a sidelink (SL) transmission-based scenario such as device-to-device (D2D) communication, vehicle-to-vehicle (V2V) communication, or vehicle-to-everything (V2X) communication, SL control information (for example, HARQ feedback information and CSI feedback information) may also be combined onto a sidelink shared channel (e.g., physical sidelink shared channel (PSSCH)) for sending. The SL control information is originally added to a physical sidelink control channel (PSCCH) or a physical sidelink feedback channel (PSFCH). For example, if the terminal device determines that a time domain location of a PSFCH carrying SL control information (for example, HARQ feedback information) is located between a time domain location of sidelink control information (SCI) and a time domain location of a PSSCH scheduled by using the SCI, the terminal device may not send the PSFCH, and combine the HARQ feedback information (namely, the SL control information) onto the PSSCH for sending. Optionally, similar to the example in FIG. 7, in an SL transmission-based scenario, a fourth time domain length and/or a fifth time domain length may also be defined, and beneficial effect of the manner of defining the fourth time domain length and/or the fifth time domain length are similar to that of the manner shown in FIG. 7. Details are not described herein again.

Figure 32:
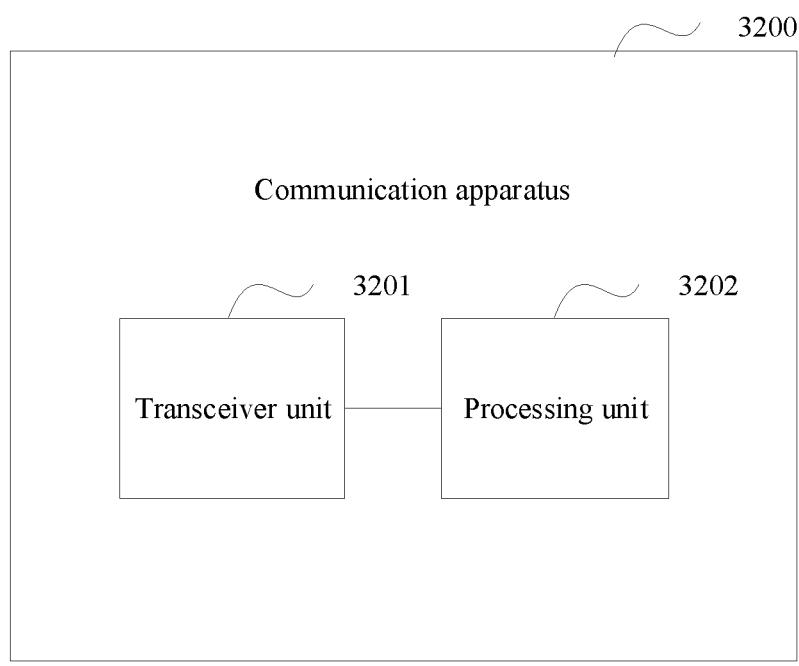
FIG. 32 is a schematic diagram of a structure of a communication apparatus according to this application.

Based on the foregoing embodiments, an embodiment of this application further provides a communication apparatus. With reference to FIG. 32, the communication apparatus 3200 may include a transceiver unit 3201 and a processing unit 3202. The transceiver unit 3201 is configured to transmit information (a message or data), namely, receive information (a message or data) or send information (a message or data), for the communication apparatus 3200. The processing unit 3202 is configured to control and manage an action of the communication apparatus 3200. The processing unit 3202 may further control steps performed by the transceiver unit 3201.

For example, the communication apparatus 3200 may be specifically the terminal device in the foregoing embodiments, or a processor, a chip or a chip system, a functional module, or the like in the terminal device. Alternatively, the communication apparatus 3200 may be specifically the network device in the foregoing embodiments, or a processor, a chip or a chip system, a functional module, or the like in the network device.

In an embodiment, when the communication apparatus 3200 is configured to implement functions of the terminal device in the embodiment shown in FIG. 2, FIG. 14, FIG. 16, or FIG. 18, the transceiver unit 3201 may implement receiving and sending operations (or a transmission operation) performed by the terminal device in the embodiment shown in FIG. 2, FIG. 14, FIG. 16, or FIG. 18; and the processing unit 3202 may implement other operations other than the receiving and sending operations performed by the terminal device in the embodiment shown in FIG. 2, FIG. 14, FIG. 16, or FIG. 18. For specific related description, refer to the related description in the embodiment shown in FIG. 2, FIG. 14, FIG. 16, or FIG. 18. Details are not described herein again.

In another embodiment, when the communication apparatus 3200 is configured to implement functions of the network device in the embodiment shown in FIG. 2, FIG. 14, FIG. 16, or FIG. 18, the transceiver unit 3201 may implement receiving and sending operations performed by the network device in the embodiment shown in FIG. 2, FIG. 14, FIG. 16, or FIG. 18; and the processing unit 3202 may implement other operations other than the receiving and sending operations performed by the network device in the embodiment shown in FIG. 2, FIG. 14, FIG. 16, or FIG. 18. For specific related description, refer to the related description in the embodiment shown in FIG. 2, FIG. 14, FIG. 16, or FIG. 18. Details are not described herein again.

It should be noted that, in this embodiment of this application, division into units is an example, and is merely a logical function division. In actual implementation, another division manner may be used. Functional units in this embodiment of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technologies, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

Figure 33:
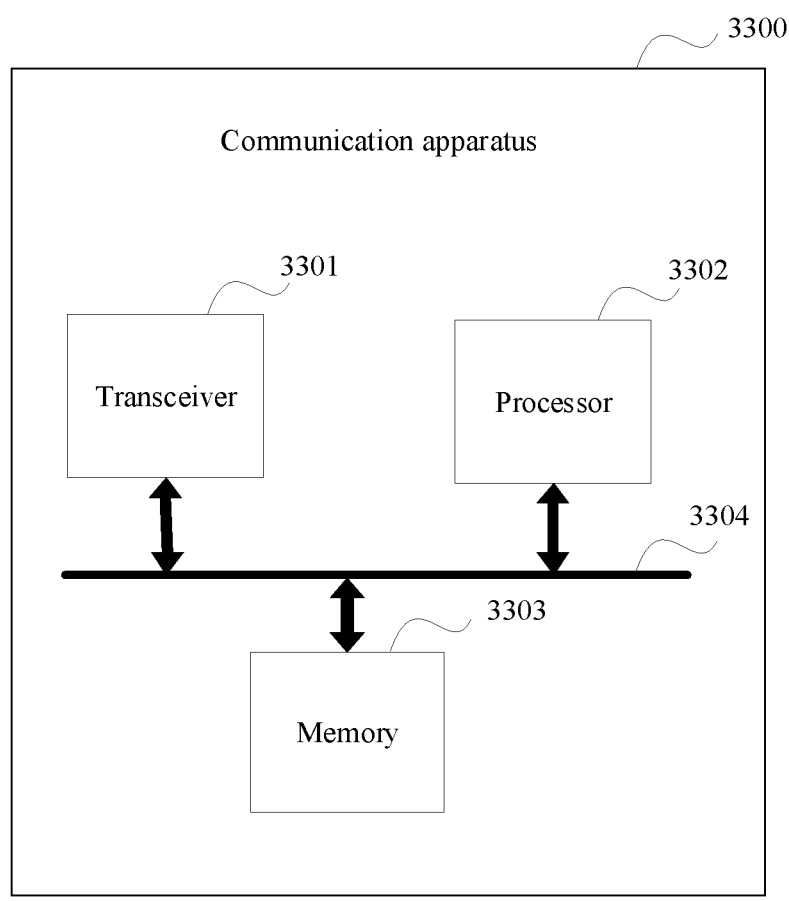
FIG. 33 is a diagram of a structure of a communication apparatus according to this application.

Based on the foregoing embodiments, an embodiment of this application further provides a communication apparatus. With reference to FIG. 33, the communication apparatus 3300 may include a transceiver 3301 and a processor 3302. Optionally, the communication apparatus 3300 may further include a memory 3303. The memory 3303 may be disposed inside the communication apparatus 3300, or may be disposed outside the communication apparatus 3300. The processor 3302 may control the transceiver 3301 to receive and send data (information or a message).

Specifically, the processor 3302 may be a central processing unit (CPU), a network processor (NP), or a combination of a CPU and an NP. The processor 3302 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof.

The transceiver 3301, the processor 3302, and the memory 3303 are connected to each other. Optionally, the transceiver 3301, the processor 3302, and the memory 3303 are connected to each other through a bus 3304. The bus 3304 may be a peripheral component interconnect (PCI) bus, an extended industry standard architecture (EISA) bus, or the like. The bus may be categorized as an address bus, a data bus, a control bus, or the like. For ease of representation, only one bold line is used to represent the bus in FIG. 33, but this does not mean that there is only one bus or only one type of bus.

In an optional implementation, the memory 3303 is configured to store a program and the like. Specifically, the program may include program code, and the program code includes computer operation instructions. The memory 3303 may include a RAM, and may further include a non-volatile memory, for example, one or more magnetic disk memories. The processor 3302 executes an application stored in the memory 3303, to implement the foregoing functions, thereby implementing functions of the communication apparatus 3300.

For example, the communication apparatus 3300 may be the terminal device in the foregoing embodiments, or may be the network device in the foregoing embodiments.

In an embodiment, when the communication apparatus 3300 implements functions of the terminal device in the embodiment shown in FIG. 2, FIG. 14, FIG. 16, or FIG. 18, the transceiver 3301 may implement receiving and sending operations (or a transmission operation) performed by the terminal device in the embodiment shown in FIG. 2, FIG. 14, FIG. 16, or FIG. 18; and the processor 3302 may implement other operations other than the receiving and sending operations performed by the terminal device in the embodiment shown in FIG. 2, FIG. 14, FIG. 16, or FIG. 18. For specific related description, refer to the related description in the embodiment shown in FIG. 2, FIG. 14, FIG. 16, or FIG. 18. Details are not described herein again.

In an embodiment, when the communication apparatus 3300 implements functions of the network device in the embodiment shown in FIG. 2, FIG. 14, FIG. 16, or FIG. 18, the transceiver 3301 may implement receiving and sending operations performed by the network device in the embodiment shown in FIG. 2, FIG. 14, FIG. 16, or FIG. 18; and the processor 3302 may implement other operations other than the receiving and sending operations performed by the network device in the embodiment shown in FIG. 2, FIG. 14, FIG. 16, or FIG. 18. For specific related description, refer to the related description in the embodiment shown in FIG. 2, FIG. 14, FIG. 16, or FIG. 18. Details are not described herein again.

Based on the foregoing embodiments, an embodiment of this application further provides a communication system. The communication system may include a terminal device, a network device, and the like.

An embodiment of this application further provides a computer-readable storage medium. The computer-readable storage medium is configured to store a computer program. When the computer program is executed by a computer, the computer may implement the uplink control information transmission method provided in the foregoing method embodiment.

An embodiment of this application further provides a computer program product. The computer program product is configured to store a computer program. When the computer program is executed by a computer, the computer may implement the uplink control information transmission method provided in the foregoing method embodiment.

An embodiment of this application further provides a chip, including a processor. The processor is coupled to a memory, and is configured to invoke a program in the memory, so that the chip implements the uplink control information transmission method provided in the foregoing method embodiment.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may be implemented in a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be alternatively stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be alternatively loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

A person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An uplink control information transmission method, comprising:
based on a relationship between a time domain location of a physical uplink control channel (PUCCH) comprising uplink control information and a time domain location of a physical uplink shared channel (PUSCH) meeting a first condition, transmitting, by a terminal device, the uplink control information to a network device through the PUSCH, wherein the first condition comprises:
the time domain location of the PUCCH is between a time domain location of downlink control information (DCI) used to schedule the PUSCH and the time domain location of the PUSCH, wherein the uplink control information comprises one or more of hybrid automatic repeat request (HARQ) feedback, a periodic channel state information (P-CSI) report, or a semi-persistent channel state information (SP-CSI) report; or
the time domain location of the PUSCH is before the time domain location of the PUCCH, and a time domain length between a time domain location of a physical downlink shared channel (PDSCH) corresponding to the uplink control information and the time domain location of the PUSCH is greater than or equal to a first time domain length, wherein the uplink control information comprises HARQ feedback; or the time domain location of the PUSCH is before the time domain location of the PUCCH, and a time domain length between a time domain location of a channel state information reference signal (CSI-RS) corresponding to the uplink control information and the time domain location of the PUSCH is greater than or equal to a second time domain length, wherein the uplink control information comprises a P-CSI report or an SP-CSI report; or the time domain location of the PUCCH is before the time domain location of the PUSCH, and a time domain length between the time domain location of the PUCCH and the time domain location of the PUSCH is less than or equal to a third time domain length, wherein the uplink control information comprises one or more of HARQ feedback, a P-CSI report, or an SP-CSI report; and based on the uplink control information comprising the P-CSI report or the SP-CSI report, the DCI triggers an aperiodic channel state information (AP-CSI) report, and the report content of the P-CSI report or the SP-CSI report comprised in the uplink control information is fully or partially the same as the report content of the AP-CSI report comprised on the PUSCH, dropping, by the terminal device, the uplink control information.

2. The method of claim 1, wherein the first condition further comprises one or more of the following:

a time domain length between the time domain location of the DCI and the time domain location of the PUCCH is greater than or equal to a fourth time domain length; or the time domain length between the time domain location of the PUCCH and the time domain location of the PUSCH is less than or equal to a fifth time domain length; or based on the uplink control information comprising the P-CSI report or the SP-CSI report and the DCI triggering an aperiodic channel state information (AP-CSI) report, report content of the P-CSI report or the SP-CSI report comprised in the uplink control information is different from report content of an AP-CSI report comprised on the PUSCH.

3. The method of claim 2, wherein the fourth time domain length is a current minimum scheduling offset.

4. The method of claim 1, wherein the transmitting, by the terminal device, the uplink control information to the network device through the PUSCH comprises:

performing, by the terminal device, bit concatenation on the uplink control information and information comprised on the PUSCH, and transmitting, to the network device through the PUSCH, information obtained through the bit concatenation; or puncturing, by the terminal device, the PUSCH, mapping the uplink control information to a punctured location of the PUSCH, and transmitting, to the network device through the PUSCH, information obtained through the puncturing and the mapping.

5. The method of claim 4, wherein:

the terminal device performs bit concatenation on the uplink control information and the information comprised on the PUSCH, and transmits, to the network device through the PUSCH, the information obtained through the bit concatenation, wherein the time domain length between the time domain location of the PUCCH and the time domain location of the PUSCH is greater than or equal to a sixth time domain length, or a quantity of information bits of the uplink control information is greater than or equal to a first value; or the terminal device punctures the PUSCH, maps the uplink control information to the punctured location of the PUSCH, and transmits, to the network device through the PUSCH, information obtained through the puncturing and the mapping, wherein the time domain length between the time domain location of the PUCCH and the time domain location of the PUSCH is less than the sixth time domain length, or a quantity of information bits of the uplink control information is less than the first value.

6. The method of claim 1, wherein before the transmitting, by the terminal device, the uplink control information to the network device through the PUSCH, the method further comprises:

determining, by the terminal device, that a reference signal received power (RSRP) sent to the network device after the terminal device receives a reference signal from the network device is greater than an RSRP threshold, wherein the RSRP is determined by the terminal device based on the reference signal.

7. The method of claim 1, wherein the transmitting, by the terminal device, the uplink control information to the network device through the PUSCH comprises:

transmitting, by the terminal device, the uplink control information to the network device through the PUSCH by using a first transmit power, wherein the first transmit power is greater than an original transmit power of the PUSCH, or the first transmit power is determined based on an original transmit power of the PUSCH and an original transmit power of the PUCCH.

8. The method of claim 1, wherein the transmitting, by the terminal device, the uplink control information to the network device through the PUSCH comprises:

determining, by the terminal device, first K bits in descending order of priorities of bits in the uplink control information, wherein the quantity of information bits of the uplink control information is greater than or equal to M, and K is less than or equal to M; and transmitting, by the terminal device, the K bits to the network device through the PUSCH.

9. The method of claim 1, wherein the first time domain length satisfies the following formula:

$$\text{first time domain length} = (N_1 + d_{1,1} + d_2)(2048 + 144) \cdot \kappa 2^{-\mu} \cdot T_C$$

wherein $N_1$ is a processing capability reported by the terminal device, and a value of $N_1$ is related to subcarrier spacing (SCS) or a system parameter;

wherein $d_{1,1}$ and $d_2$ are related to a PDSCH mapping type;

wherein $\mu$ is a system parameter;

wherein $T_c = 1/(\Delta f_{max} \cdot N_f)$, $\Delta f_{max} = 480 \cdot 10^3$ Hz, and $N_f = 4096$; and wherein $\kappa = T_s/T_c = 64$, $T_s = 1/(\Delta f_{ref} \cdot N_{f,ref})$, and $\Delta f_{ref} = 15 \cdot 10^3$ Hz.

10. The method of claim 1, wherein the second time domain length satisfies the following formula:

$$\text{second time domain length} = (Z)(2048 + 144) \cdot \kappa 2^{-\mu} \cdot T_C$$

wherein Z is a predefined value;

wherein $T_c = 1/(\Delta f_{max} \cdot N_f)$, $\Delta f_{max} = 480 \cdot 10^3$ Hz, and $N_f = 4096$; and wherein $\kappa = T_s/T_c = 64$, $T_s = 1/(\Delta f_{ref} \cdot N_{f,ref})$, and $\Delta f_{ref} = 15 \cdot 10^3$ Hz.

11. An uplink control information transmission method, comprising:

based on a relationship between a time domain location of a physical uplink control channel (PUCCH) comprising uplink control information and a time domain location of a physical uplink shared channel (PUSCH) meeting a first condition, receiving, by a network device, the uplink control information from a terminal device through the PUSCH;

wherein the first condition comprises:
the time domain location of the PUCCH is between a time domain location of downlink control information (DCI) used to schedule the PUSCH and the time domain location of the PUSCH, wherein the uplink control information comprises one or more of hybrid automatic repeat request (HARQ) feedback, a periodic channel state information (P-CSI) report, or a semi-persistent channel state information (SP-CSI) report; or the time domain location of the PUSCH is before the time domain location of the PUCCH, and a time domain length between a time domain location of a physical downlink shared channel (PDSCH) corresponding to the uplink control information and the time domain location of the PUSCH is greater than or equal to a first time domain length, wherein the uplink control information comprises HARQ feedback; or the time domain location of the PUSCH is before the time domain location of the PUCCH, and a time domain length between a time domain location of a channel state information reference signal (CSI-RS) corresponding to the uplink control information and the time domain location of the PUSCH is greater than or equal to a second time domain length, wherein the uplink control information comprises a P-CSI report or an SP-CSI report; or the time domain location of the PUCCH is before the time domain location of the PUSCH, and a time domain length between the time domain location of the PUCCH and the time domain location of the PUSCH is less than or equal to a third time domain length, wherein the uplink control information comprises one or more of HARQ feedback, a P-CSI report, or an SP-CSI report;

wherein before the receiving, by the network device, the uplink control information from the terminal device through the PUSCH, the method further comprises:
determining, by the network device, that a reference signal received power (RSRP) from the terminal device is greater than an RSRP threshold, wherein the RSRP is sent after the terminal device receives a reference signal from the network device, and the RSRP is determined by the terminal device based on the reference signal.

12. The method of claim 11, wherein the first condition further comprises one or more of the following:
a time domain length between the time domain location of the DCI and the time domain location of the PUCCH is greater than or equal to a fourth time domain length; or
the time domain length between the time domain location of the PUCCH and the time domain location of the PUSCH is less than or equal to a fifth time domain length; or
based on the uplink control information comprising the P-CSI report or the SP-CSI report and the DCI triggers an aperiodic channel state information (AP-CSI) report, report content of the P-CSI report or the SP-CSI report comprised in the uplink control information is different from report content of an AP-CSI report comprised on the PUSCH.

13. The method of claim 12, wherein the fourth time domain length is a current minimum scheduling offset.

14. The method of claim 11, wherein the receiving, by the network device, the uplink control information from the terminal device through the PUSCH comprises:
receiving, by the network device through the PUSCH, information obtained by performing bit concatenation on the uplink control information and information comprised on the PUSCH by the terminal device; or
receiving, by the network device through the PUSCH, information obtained by puncturing the PUSCH and mapping the uplink control information to a punctured location of the PUSCH by the terminal device.

15. The method of claim 14, wherein:
the network device receives, through the PUSCH, the information obtained by performing bit concatenation on the uplink control information and the information comprised on the PUSCH by the terminal device, wherein the time domain length between the time domain location of the PUCCH and the time domain location of the PUSCH is greater than or equal to a sixth time domain length, or a quantity of information bits of the uplink control information is greater than or equal to a first value; or
the network device receives, through the PUSCH, the information obtained by puncturing the PUSCH and mapping the uplink control information to the punctured location of the PUSCH by the terminal device, wherein the time domain length between the time domain location of the PUCCH and the time domain location of the PUSCH is less than the sixth time domain length, or a quantity of information bits of the uplink control information is less than the first value.

16. A terminal device, comprising:
a processor; and
a memory storing a computer program code, wherein the computer program code comprises instructions that, when run on the processor, cause the processor to perform the steps of:
based on a relationship between a time domain location of a physical uplink control channel (PUCCH) comprising uplink control information and a time domain location of a physical uplink shared channel PUSCH meeting a first condition, transmitting, by the terminal device, the uplink control information to a network device through the PUSCH, wherein the first condition comprises:
the time domain location of the PUCCH is between a time domain location of downlink control information (DCI) used to schedule the PUSCH and the time domain location of the PUSCH, wherein the uplink control information comprises one or more of hybrid automatic repeat request (HARQ) feedback, a periodic channel state information (P-CSI) report, or a semi-persistent channel state information (SP-CSI) report; or
the time domain location of the PUSCH is before the time domain location of the PUCCH, and a time domain length between a time domain location of a physical downlink shared channel (PDSCH) corresponding to the uplink control information and the time domain location of the PUSCH is greater than or equal to a first time domain length, wherein the uplink control information comprises HARQ feedback; or
the time domain location of the PUSCH is before the time domain location of the PUCCH, and a time domain length between a time domain location of a channel state information reference signal (CSI-RS) corresponding to the uplink control information and the time domain location of the PUSCH is greater than or equal to a second time domain length, wherein the uplink control information comprises a P-CSI report or an SP-CSI report; or the time domain location of the PUCCH is before the time domain location of the PUSCH, and a time domain length between the time domain location of the PUCCH and the time domain location of the PUSCH is less than or equal to a third time domain length, wherein the uplink control information comprises one or more of HARQ feedback, a P-CSI report, or an SP-CSI report; and based on the uplink control information comprising the P-CSI report or the SP-CSI report, the DCI triggers an aperiodic channel state information (AP-CSI) report, and the report content of the P-CSI report or the SP-CSI report comprised in the uplink control information is fully or partially the same as the report content of the AP-CSI report comprised on the PUSCH, dropping, by the terminal device, the uplink control information.

17. The terminal device of claim 16, wherein the first condition further comprises one or more of the following:

a time domain length between the time domain location of the DCI and the time domain location of the PUCCH is greater than or equal to a fourth time domain length; or the time domain length between the time domain location of the PUCCH and the time domain location of the PUSCH is less than or equal to a fifth time domain length; or based on the uplink control information comprising the P-CSI report or the SP-CSI report and the DCI triggering an aperiodic channel state information (AP-CSI) report, report content of the P-CSI report or the SP-CSI report comprised in the uplink control information is different from report content of an AP-CSI report comprised on the PUSCH.

18. The terminal device of claim 17, wherein the fourth time domain length is a current minimum scheduling offset.

19. The terminal device of claim 16, wherein the transmitting, by the terminal device, the uplink control information to the network device through the PUSCH comprises:

performing, by the terminal device, bit concatenation on the uplink control information and information comprised on the PUSCH, and transmitting, to the network device through the PUSCH, information obtained through the bit concatenation; or puncturing, by the terminal device, the PUSCH, mapping the uplink control information to a punctured location of the PUSCH, and transmitting, to the network device through the PUSCH, information obtained through the puncturing and the mapping.

20. The terminal device of claim 19, wherein:

the terminal device performs bit concatenation on the uplink control information and the information comprised on the PUSCH, and transmits, to the network device through the PUSCH, the information obtained through the bit concatenation, wherein the time domain length between the time domain location of the PUCCH and the time domain location of the PUSCH is greater than or equal to a sixth time domain length, or a quantity of information bits of the uplink control information is greater than or equal to a first value; or the terminal device punctures the PUSCH, maps the uplink control information to the punctured location of the PUSCH, and transmits, to the network device through the PUSCH, information obtained through the puncturing and the mapping, wherein the time domain length between the time domain location of the PUCCH and the time domain location of the PUSCH is less than the sixth time domain length, or a quantity of information bits of the uplink control information is less than the first value.

* * * * *